United States Patent
Hügli et al.

(10) Patent No.: US 6,824,111 B1
(45) Date of Patent: Nov. 30, 2004

(54) SUPPORTING AND FASTENING DEVICE FOR CONTACT WIRES

(75) Inventors: Reto Hügli, Zürich (CH); Manuel José Garcia, Räterschen (CH)

(73) Assignee: Kummler + Matter AG (CH)

( * ) Notice: Subject to any disclaimer, the term of this patent is extended or adjusted under 35 U.S.C. 154(b) by 0 days.

(21) Appl. No.: 09/674,909

(22) PCT Filed: May 8, 1999

(86) PCT No.: PCT/EP99/03166

§ 371 (c)(1),
(2), (4) Date: Dec. 7, 2000

(87) PCT Pub. No.: WO99/58362

PCT Pub. Date: Nov. 18, 1999

(30) Foreign Application Priority Data

May 8, 1998 (DE) .......................................... 198 20 598

(51) Int. Cl.[7] ................................................. F16L 3/00
(52) U.S. Cl. ......................... 248/49; 248/200; 248/201; 248/223.31
(58) Field of Search .......................... 248/49, 201, 200, 248/223.31, 221.11, 221.12, 222.41, 224.8, 278.1, 289.11, 219.2, 218.4, 251, 309.1, 341

(56) References Cited

U.S. PATENT DOCUMENTS

| | | | | |
|---|---|---|---|---|
| 2,248,410 A | * | 7/1941 | Moeller ................... | 248/224.51 |
| 3,134,978 A | * | 5/1964 | Arvay, Jr. .................... | 343/709 |
| 3,570,794 A | * | 3/1971 | Kirschner ................... | 248/74.4 |
| 4,034,946 A | * | 7/1977 | Zimmer, Jr. ............. | 248/183.2 |
| 4,247,069 A | * | 1/1981 | Kurz ....................... | 248/183.2 |
| 5,004,193 A | * | 4/1991 | Kirschner ................... | 248/59 |
| 5,007,603 A | * | 4/1991 | Kirschner ................... | 248/59 |
| 5,145,132 A | * | 9/1992 | Kirschner ................... | 248/59 |
| 5,154,382 A | * | 10/1992 | Hoshino ................... | 248/185.1 |
| 5,387,033 A | * | 2/1995 | Domenig ................ | 312/334.5 |
| 5,641,612 A | * | 6/1997 | Lee et al. ................... | 430/321 |
| 5,709,057 A | * | 1/1998 | Johnson et al. ............... | 52/301 |
| 5,823,849 A | * | 10/1998 | Gardner et al. ............. | 446/473 |

FOREIGN PATENT DOCUMENTS

| | | | | |
|---|---|---|---|---|
| EP | 0 607 830 | | 7/1994 | |
| FR | 2 734 957 | | 12/1996 | |
| GB | 2 262 432 A | * | 6/1993 | ........... A47B/96/06 |
| JP | 6-10450 | * | 1/1994 | ................. 248/200 |

OTHER PUBLICATIONS

PCT Publication WO 95/04896 (BALFOUR) "Flashlight Adaptor" Feb. 16, 1995.*

* cited by examiner

*Primary Examiner*—Anita King
*Assistant Examiner*—Amy J. Sterling
(74) *Attorney, Agent, or Firm*—Bachman & LaPointe, P.C.

(57) ABSTRACT

The invention relates to a supporting and fastening device for contact wires comprising a preferably one-piece longitudinally extended supporting piece (28, 84) which can be fixed to a pole, pipe, a building well or the like. The inventive device also comprises a coupling element (12, 52, 64, 86; 130, 138) for connecting the supporting piece (28) to a bracing tube or the like. The supporting piece (28) comprises a preferably central, first hole (38) which is provided for interacting with a fitted connecting section (36, 132) of the coupling element and is configured for realizing a connection which can be plugged in, detached, is prevented from running, and which remains fixed when placed under tensile and or pressure load.

13 Claims, 22 Drawing Sheets

Figure 1:
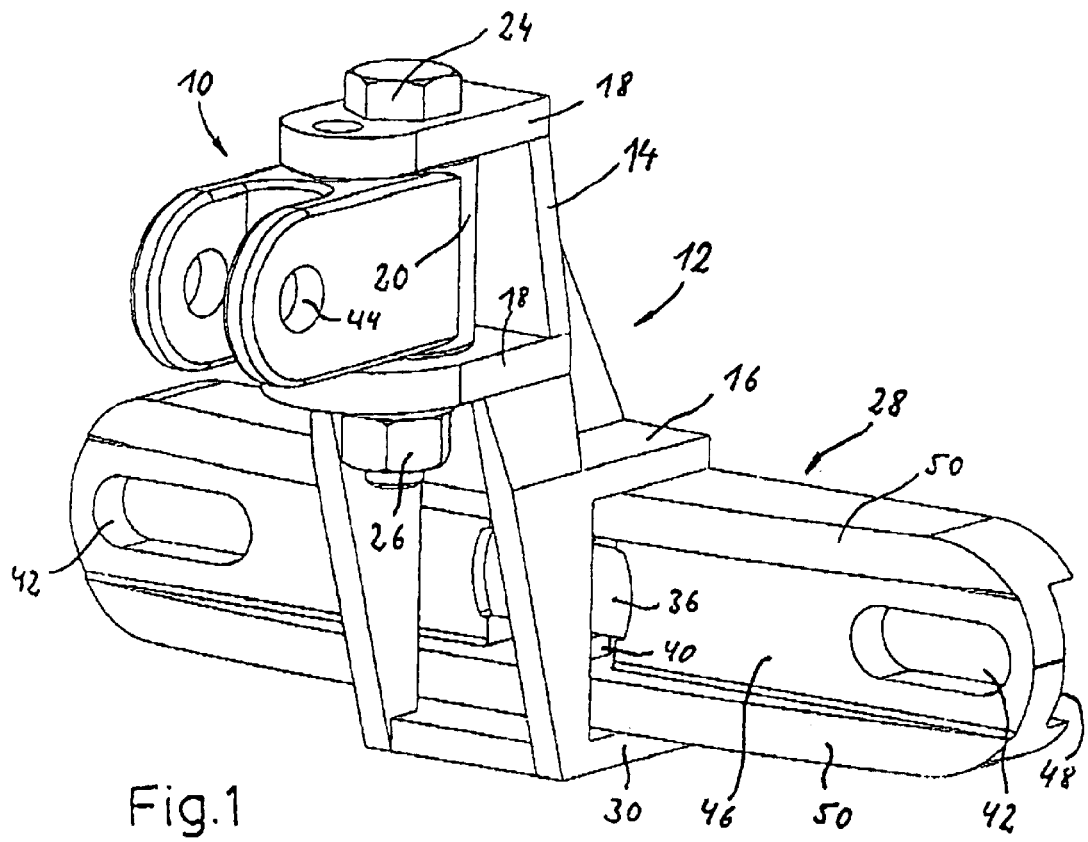

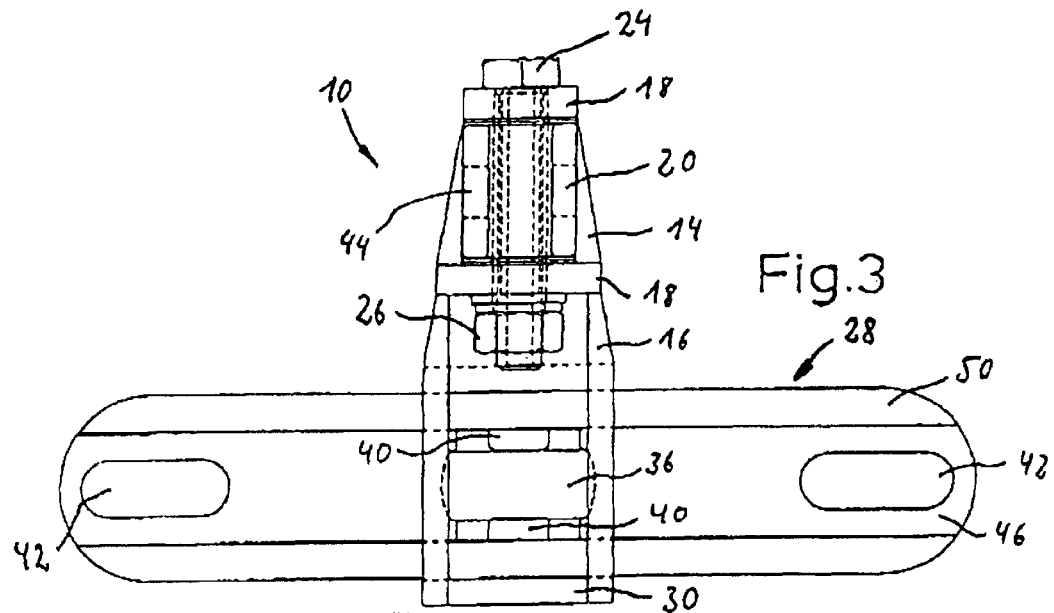
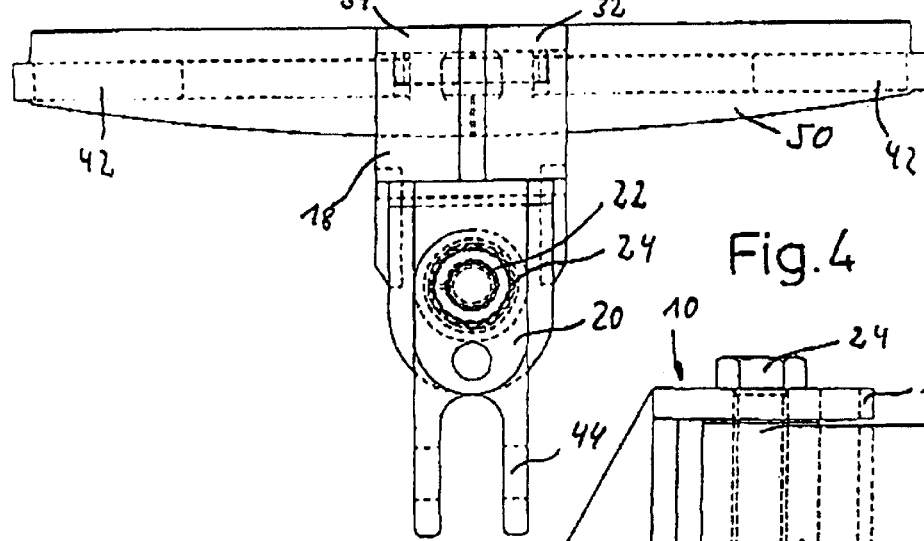
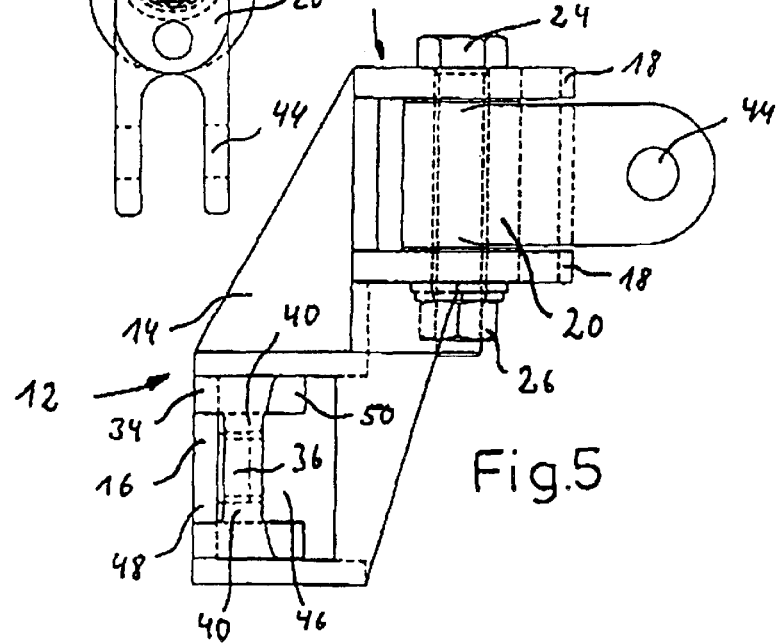

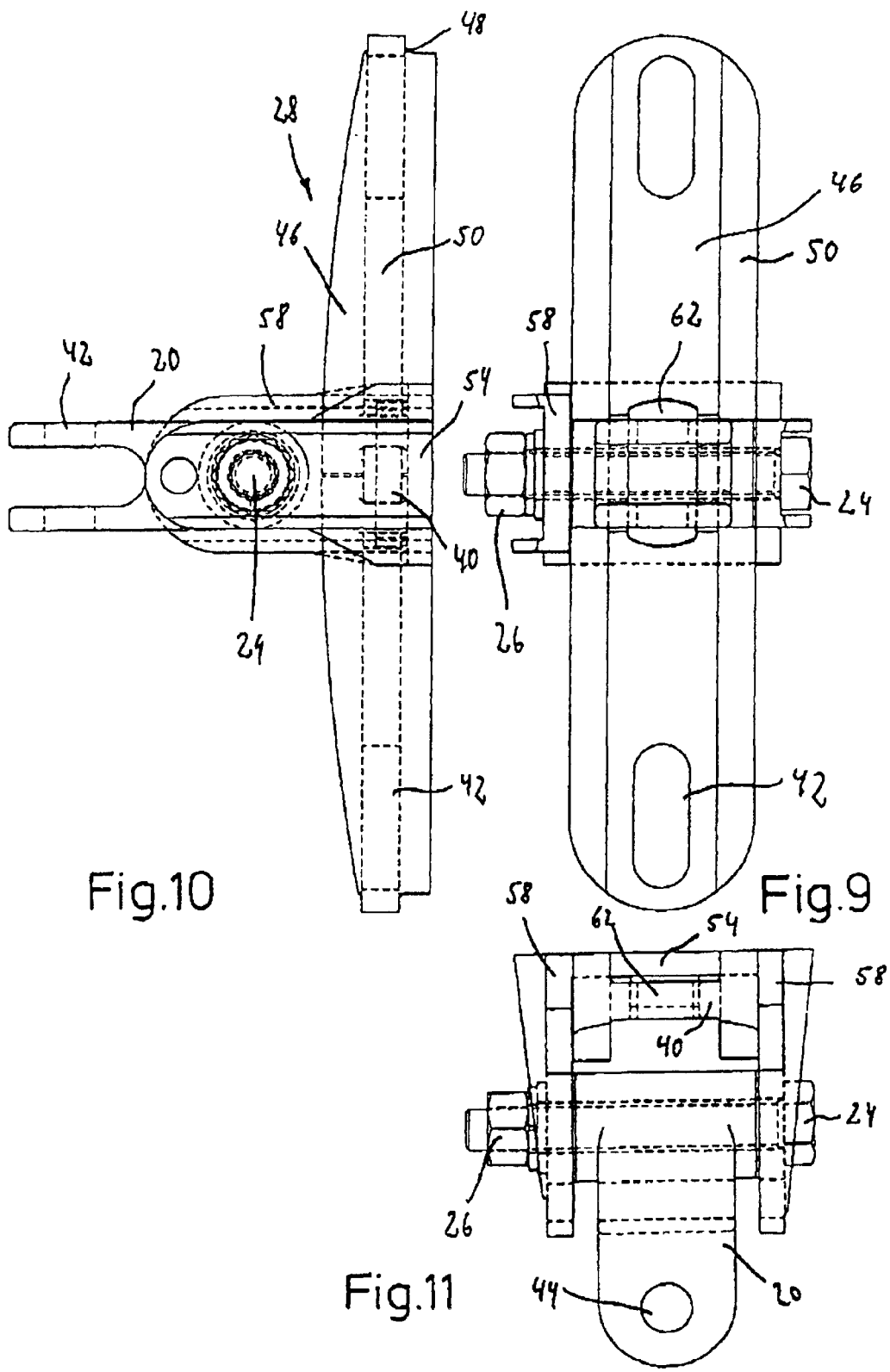

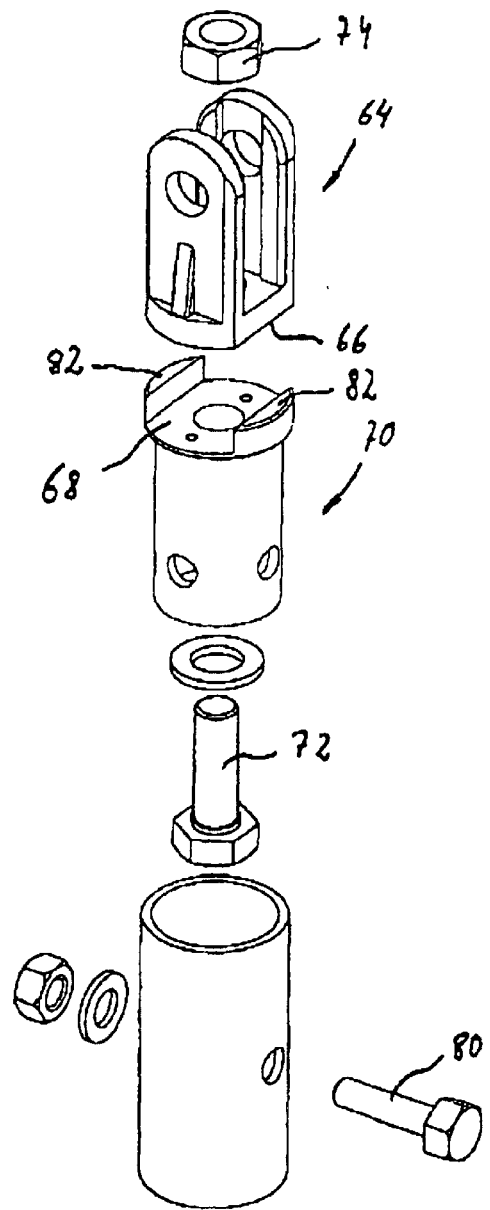
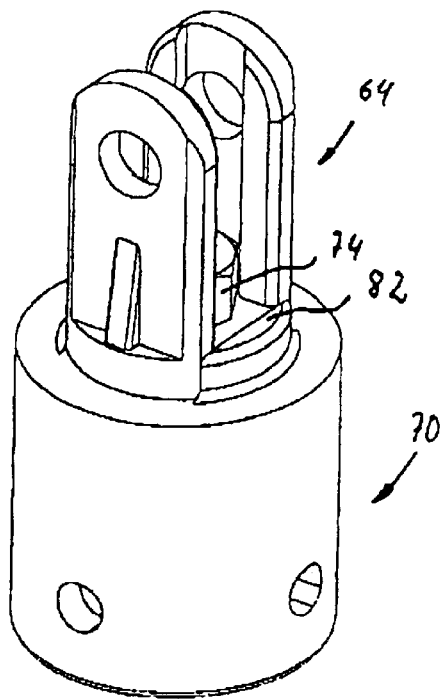
Fig.14
Fig.13

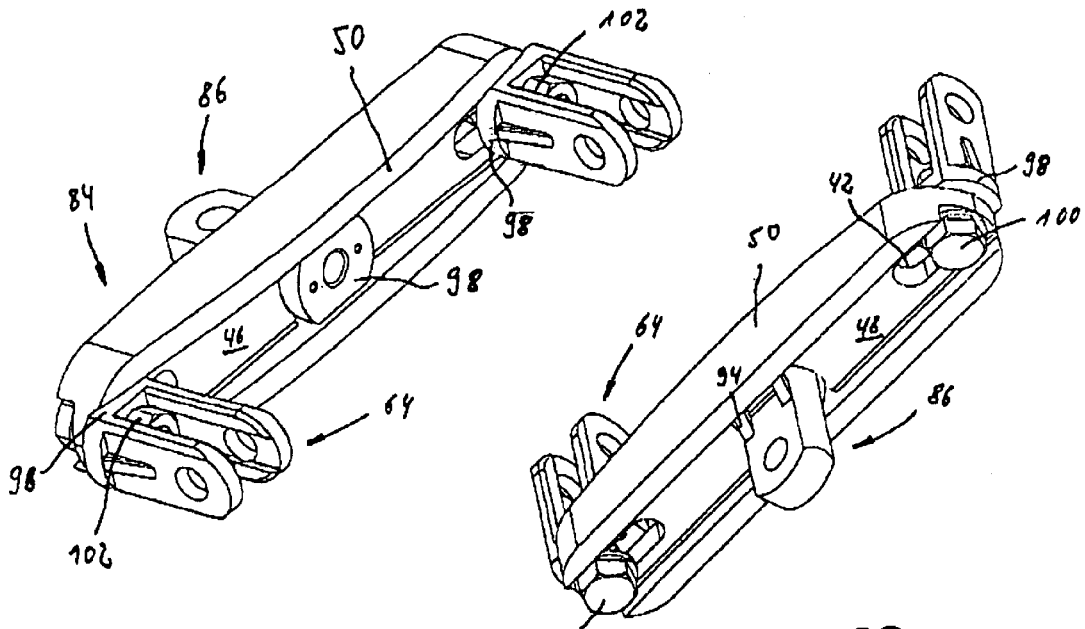
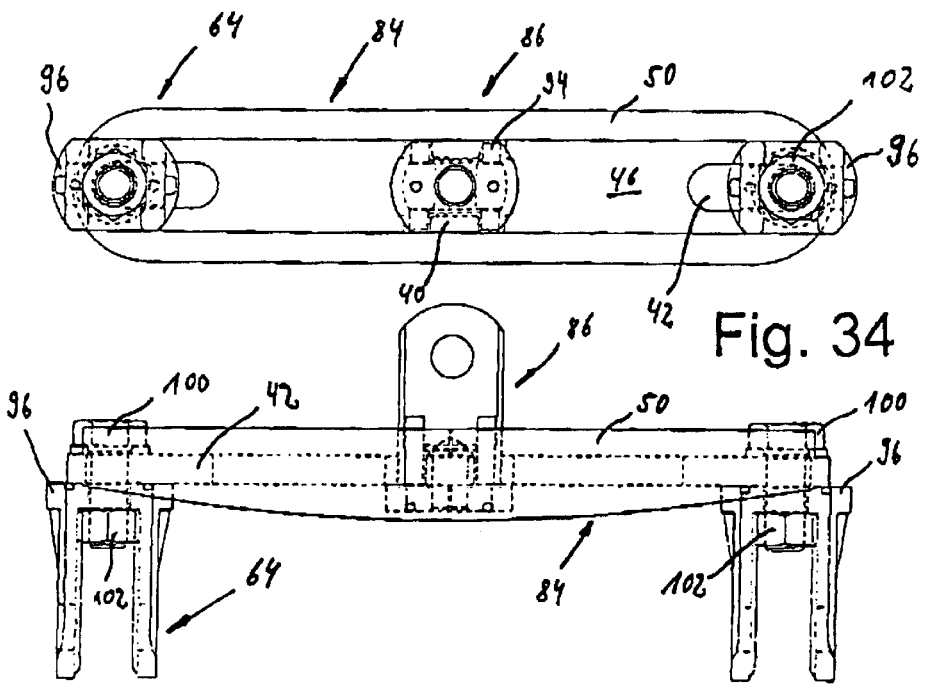

SUPPORTING AND FASTENING DEVICE FOR CONTACT WIRES

The present invention concerns a supporting and fastening arrangement for contact wires. Arrangements of that kind are generally known for example as outrigger or cantilever arm systems for catenary or contact lines, for example in short-range or local public passenger transport.

The wide range of possible uses of cantilever arm systems for overhead contact wires and the large number of different specific requirements, systems and area of use however mean that usually there is a need for a large variety of types of individual components, corresponding to a respective purpose of use, and that requires the production and stockkeeping of a large variety of types, in particular on the part of manufacturers with a wide range of products to offer. That then means that systems which are specifically put together—in spite of the high total number of components involved—are necessarily complicated and thus expensive.

Numerous alternative configurations of supporting and fastening arrangements for contact wires are also known from the state of the art, which, by virtue of the mechanical aspects involved, often require really expensive connections, in particular also screw connections, and which therefore give rise to corresponding expenditure in terms of installation, assembly and maintenance.

In the light of that basic position therefore the object of the present invention is to provide a supporting and fastening arrangement for contact wires, in particular in the form of a cantilever arm system, which on the basis of structurally simple components which can be used in a flexible and variable fashion, permits use in the most widely varying alternative forms, and which moreover in regard to the necessary mechanical coupling or connecting properties, can be easily assembled and is nonetheless strong.

That object is attained by the supporting and fastening arrangement having the features of claim 1 and the apparatus as set forth in claim 12.

The support portion according to the invention and the coupling element co-operating therewith, as the core elements of this supporting and fastening arrangement according to the invention, to attain the object thereof, permit virtually any use of the arrangement, in which respect the support portion can itself be universally secured or fastened, and in addition is also suitable for easily receiving at least one counterpart coupling component, in positively locking and non-rotational relationship, while there is the particular advantage that the plug connection, just by virtue of a tensile or pressure loading acting thereon, already permits secure mechanical coupling.

Independent protection in accordance with the present invention is also claimed for a coupling element which is admittedly particularly advantageously suitable for use in the supporting and fastening arrangement, but which, separately therefrom, is also suitable in isolation for independent fastening to a mast or pylon or pipe. More specifically, in a surprisingly simple and structurally elegant fashion, the recess which is provided at the rear side and which is preferably in the form of an obtuse V-shape provides that the coupling element which is produced in one piece can be fitted to cylindrical supports of virtually any diameter for fixing purposes, wherein the fastening portions mounted thereto then serve in a particularly simple manner as rests for suitable fastening means, in particular in the form of strips, bands or the like.

Advantageous developments of the invention are described in the appendant claims.

Thus, it is particularly preferable for the elongate support portion to be in the form of a double-T-profile portion and to be provided with at least one additional slot, wherein in a particularly suitable configuration the first opening and a slot of that kind are designed for directly non-rotationally receiving fork and/or bar elements—which in that respect are to be viewed as coupling elements in accordance with the main claim. In this context both the bar portion of the bar element and also a fork portion of the fork element is to be viewed as a projection in accordance with the main claim.

It is also particularly preferable for the coupling element to be in the form of a receiving holder for introducing or holding the support element, in which case then the receiving holder in particular affords the possibility of providing a pivotal connection.

The fork and/or bar elements which can be used in accordance with the present invention enhance the universality of use of the supporting and fixing arrangement according to the invention; thus, they not only permit connection to each other—that is to say a bar element engages into a fork element—but in addition a respective pipe end, insulator or the like can be respectively coupled by way of those coupling elements.

It is particularly preferred for a plurality of coupling elements to be simultaneously fastened to a support portion.

All in all therefore what is provided is an arrangement which combines simple assemblability—in particular no screw connections or the like whatsoever are required for a connection with the central opening—with a high level of mechanical strength and maximum flexibility for constructing virtually any cantilever arm systems.

Figure 2:
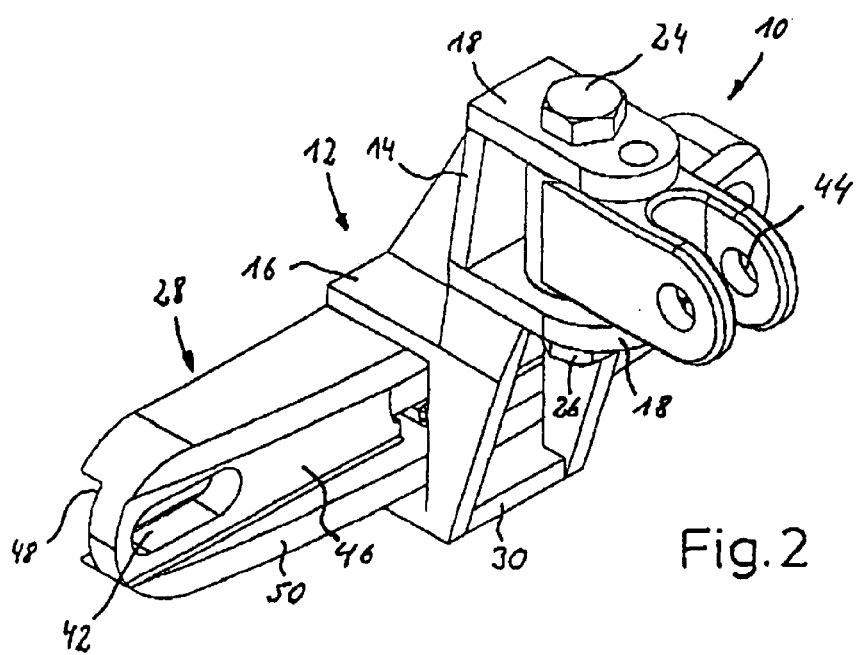
Figure 6:
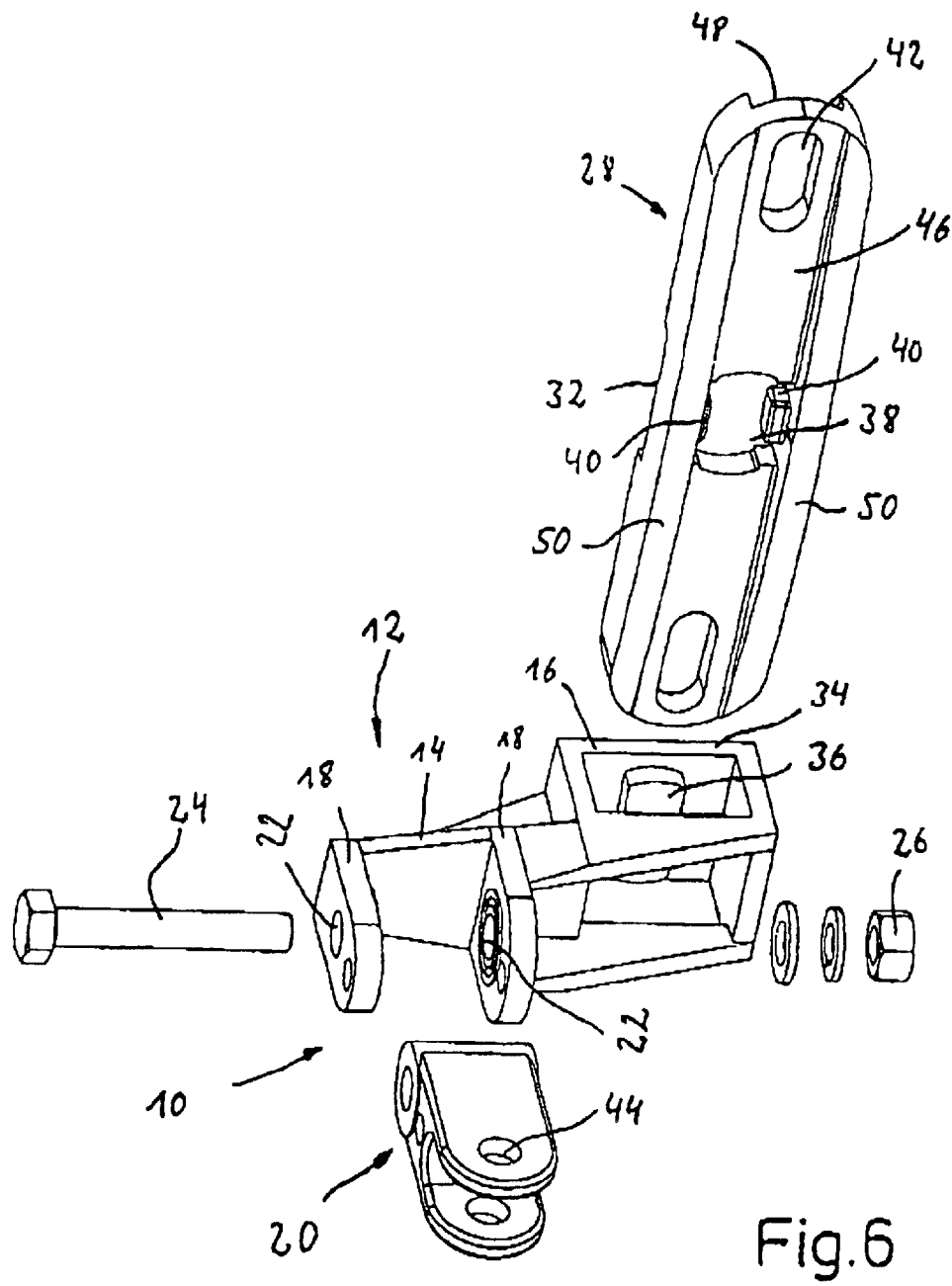
Figure 7:
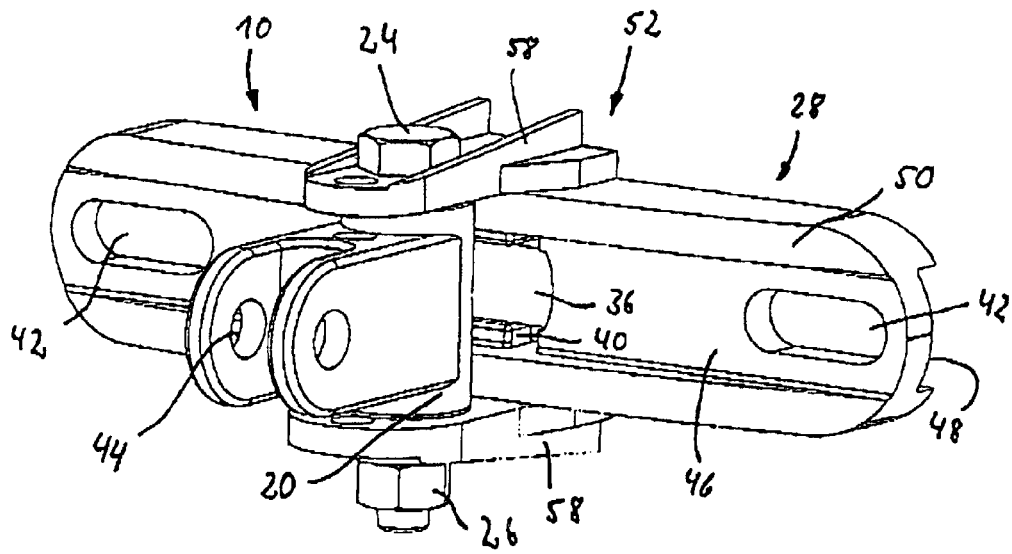
Figure 8:
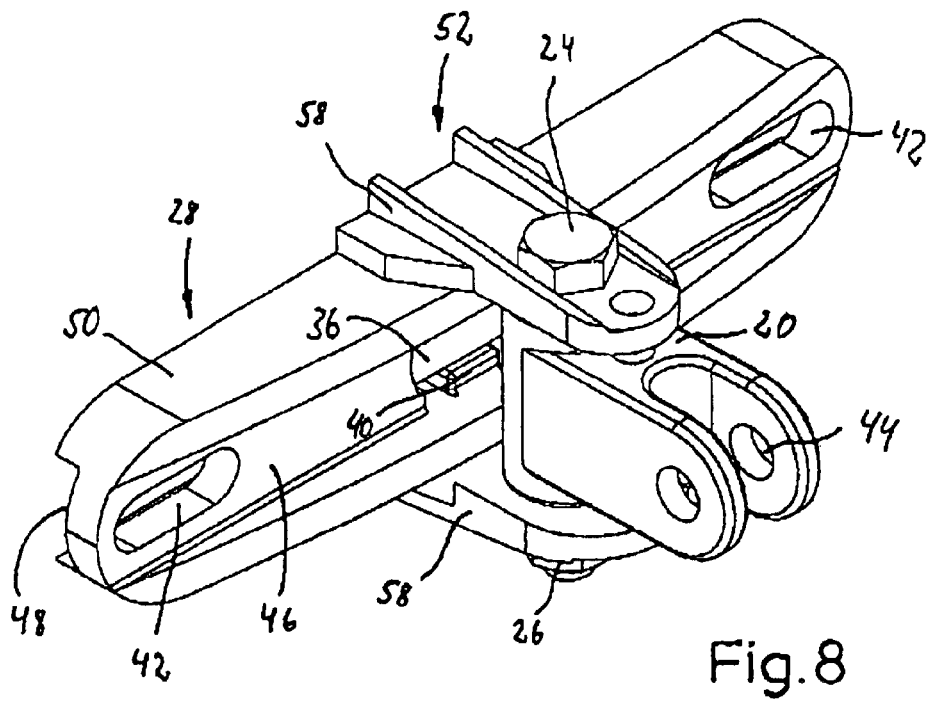
Figure 12:
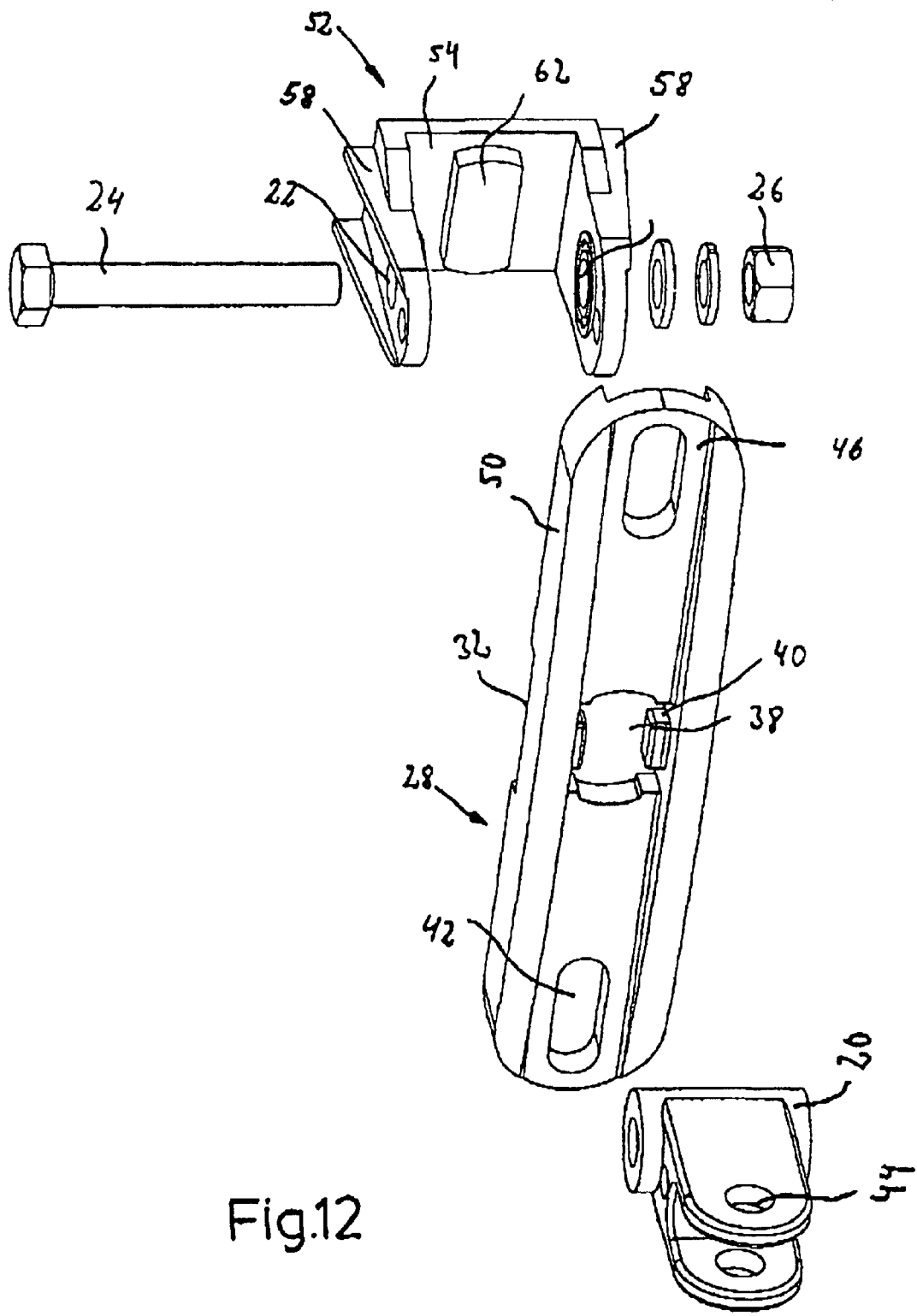
Figure 15:
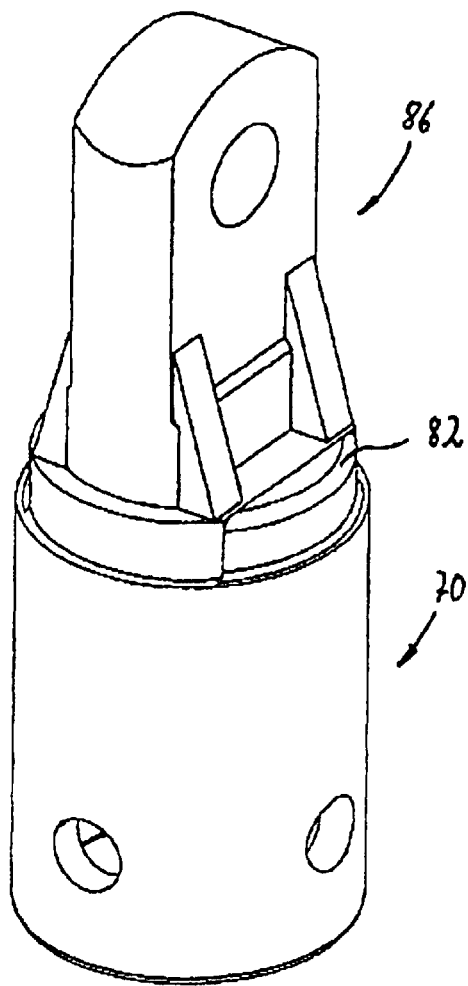
Figure 16:
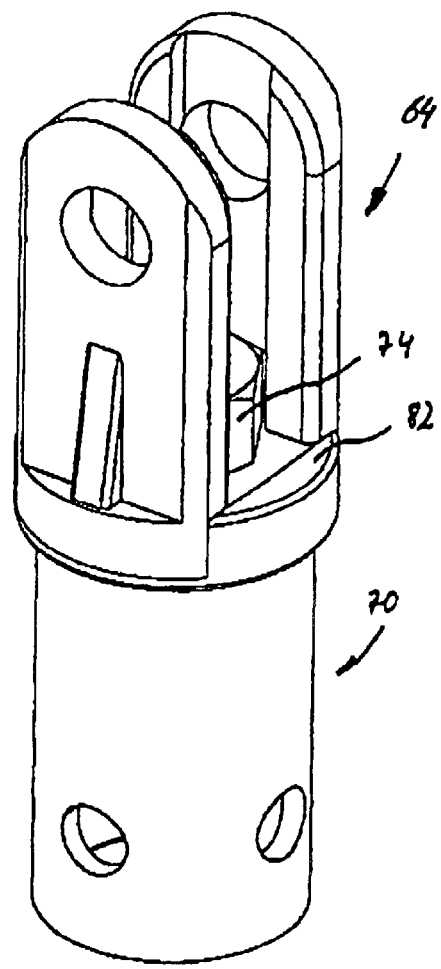
Figure 17:
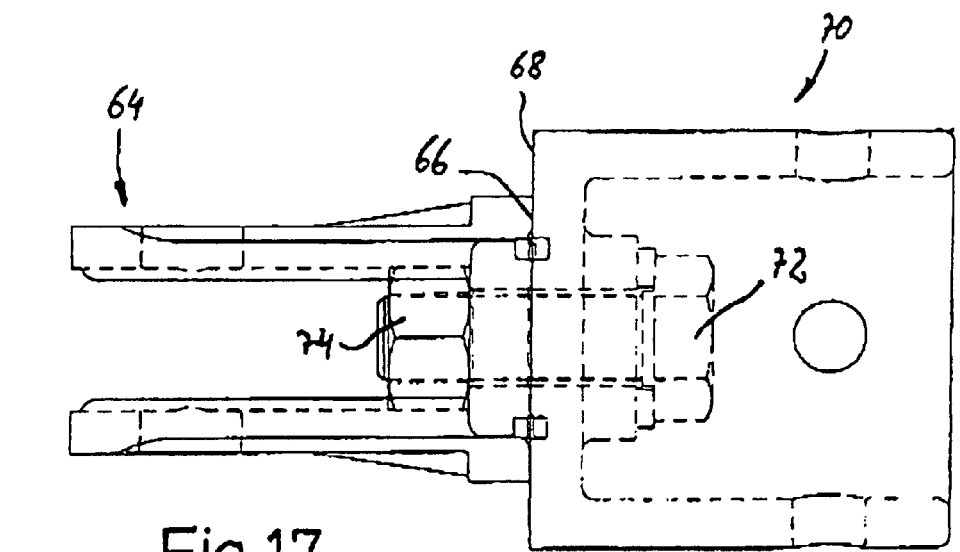
Figure 18:
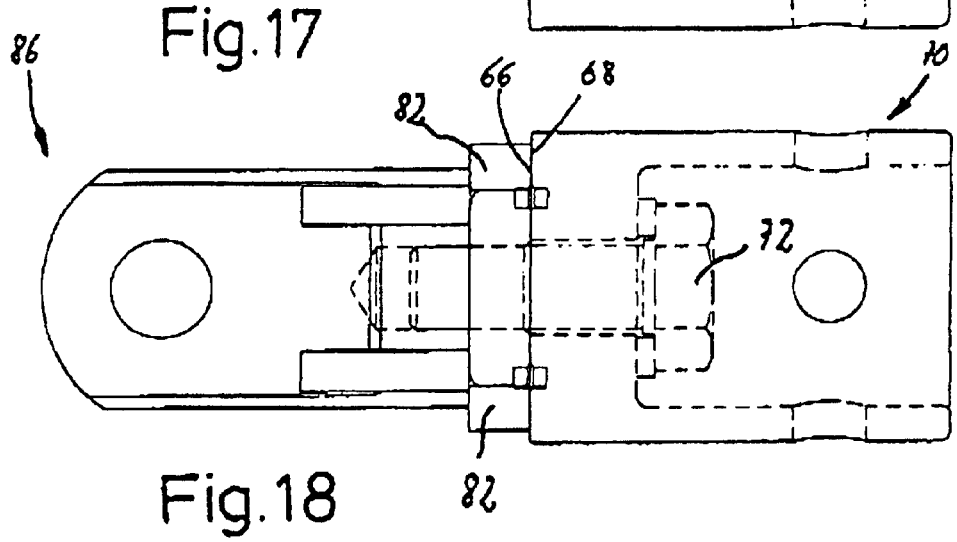
Figure 19:
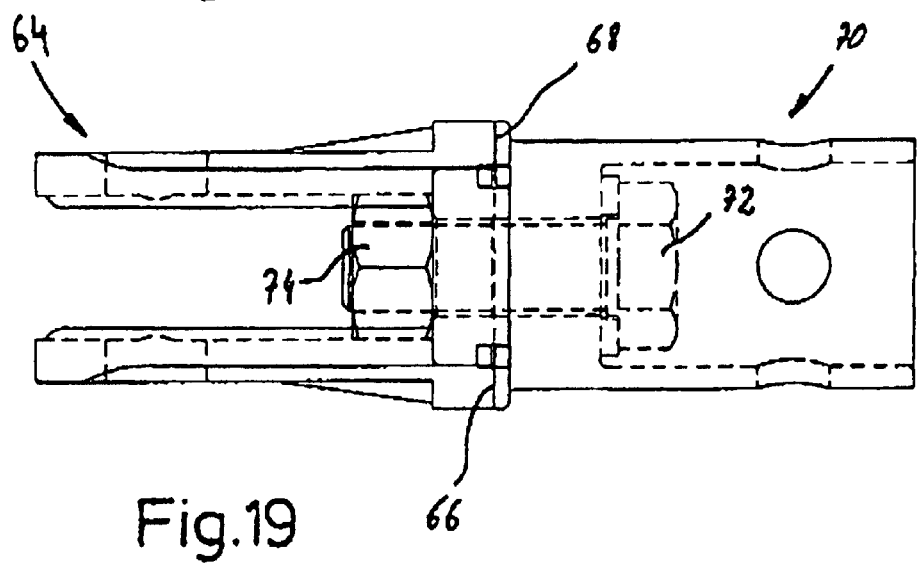
Figure 20:
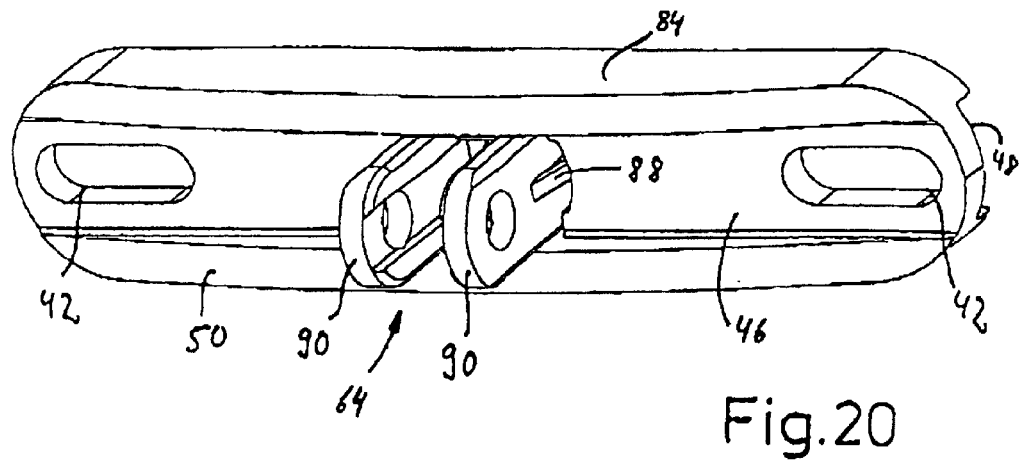
Figure 21:
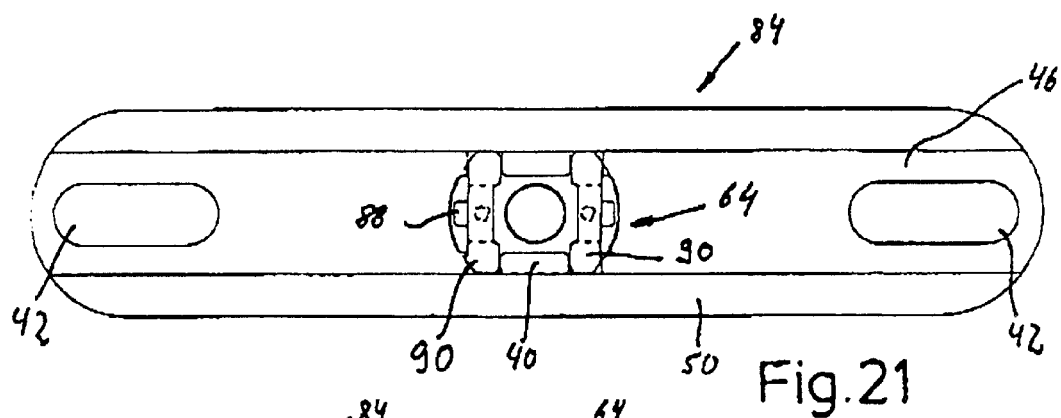
Figure 22:
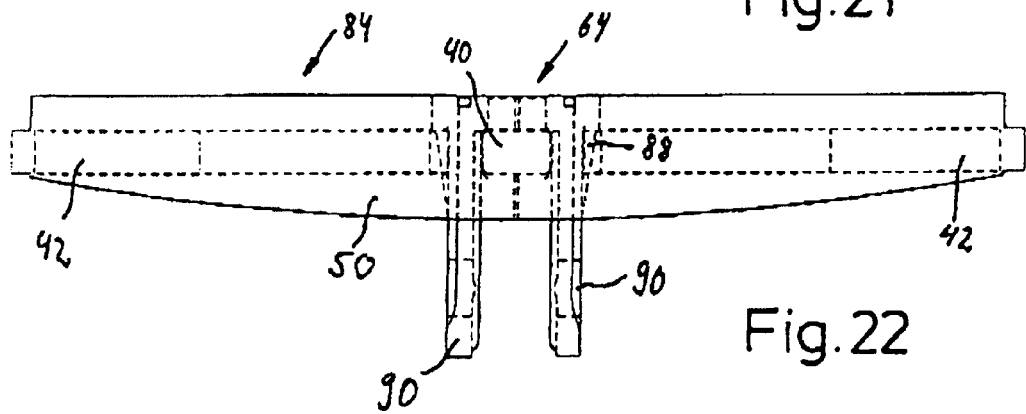
Figure 23:
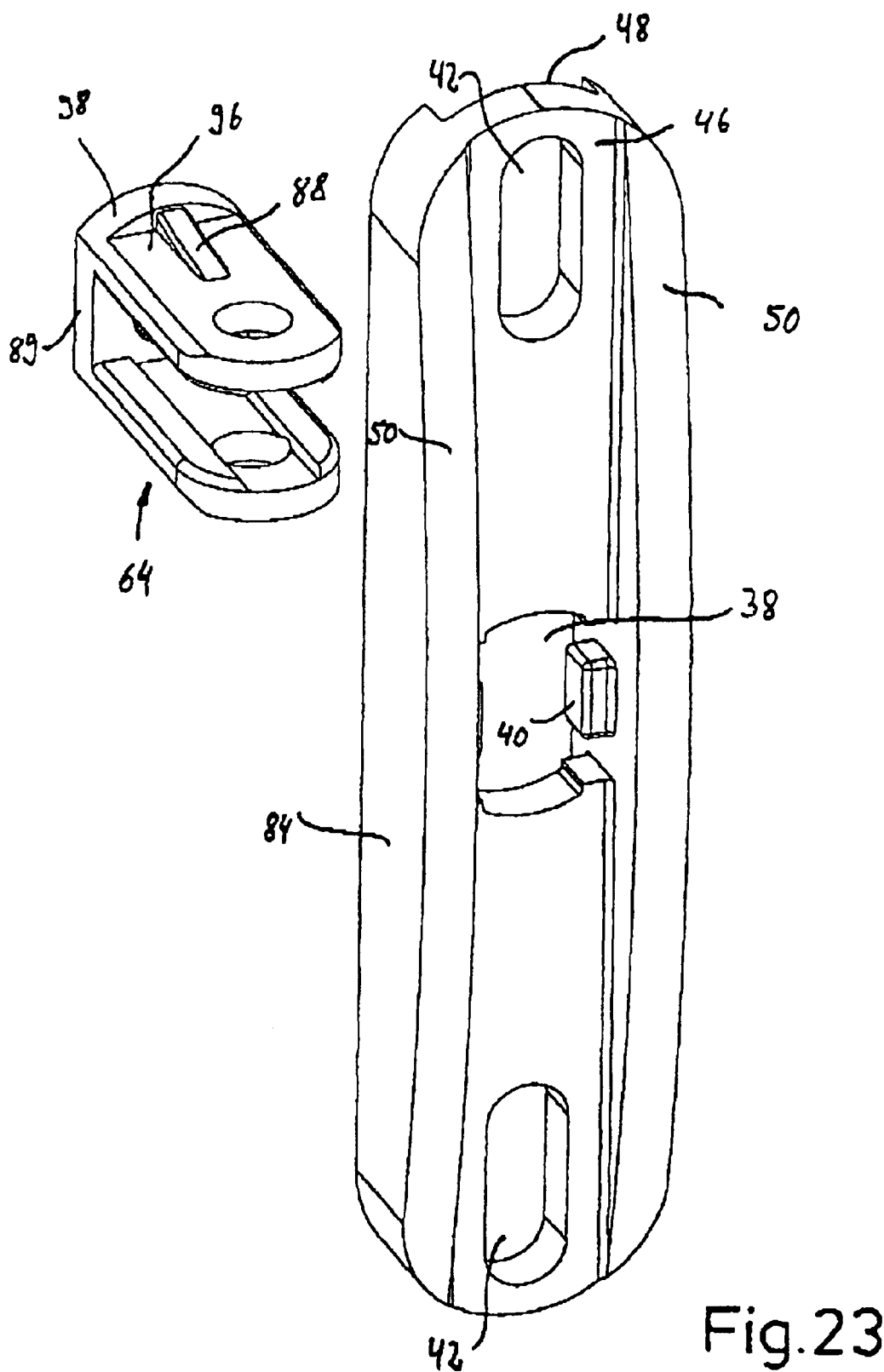
Figure 24:
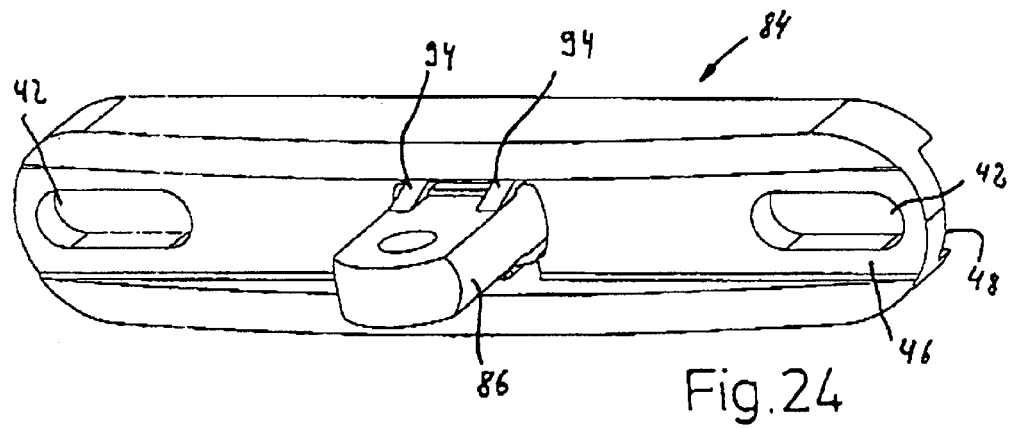
Figure 25:
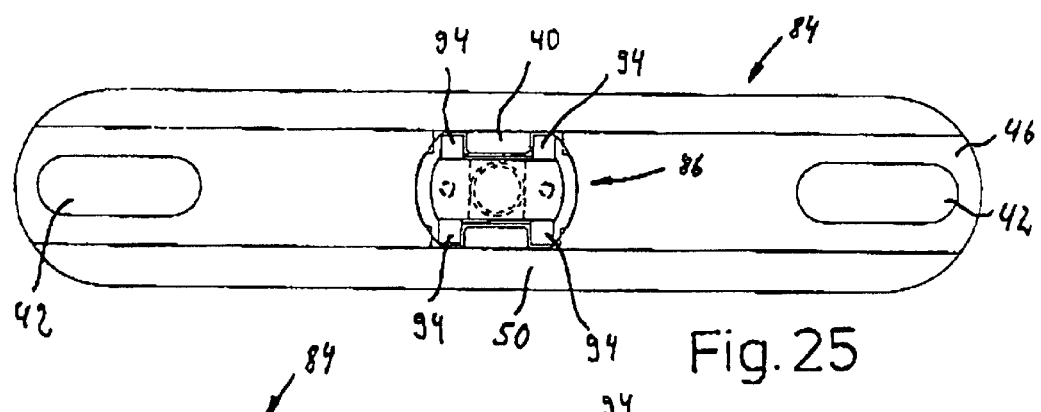
Figure 26:
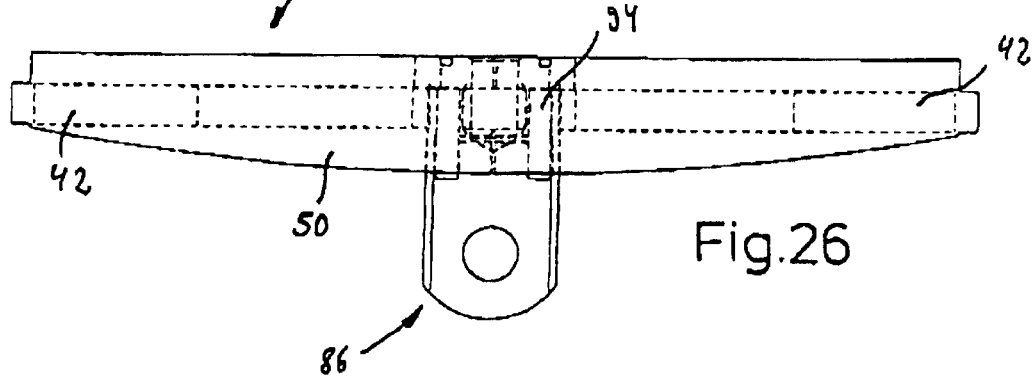
Figure 27:
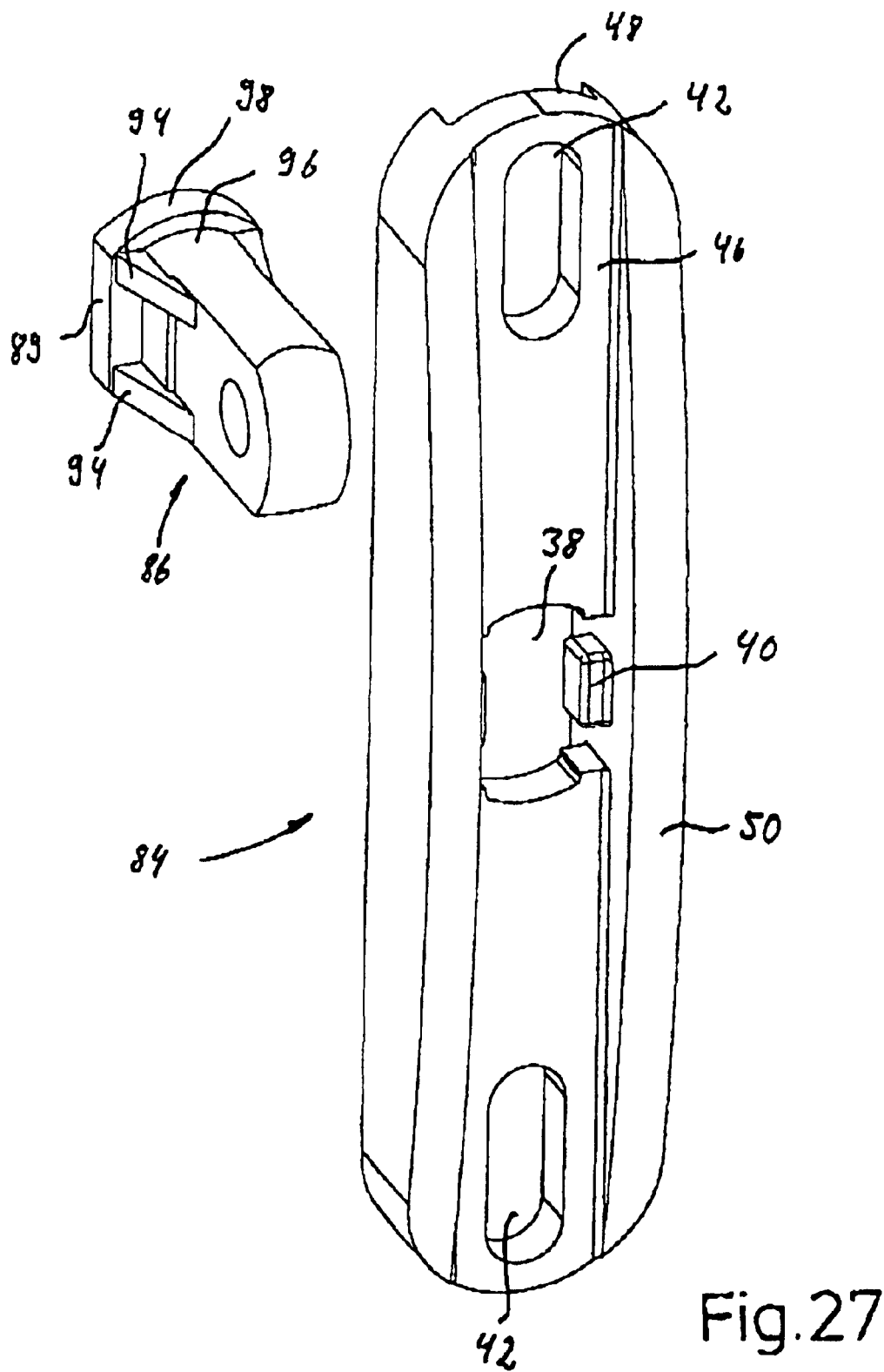
Figures 28, 29:
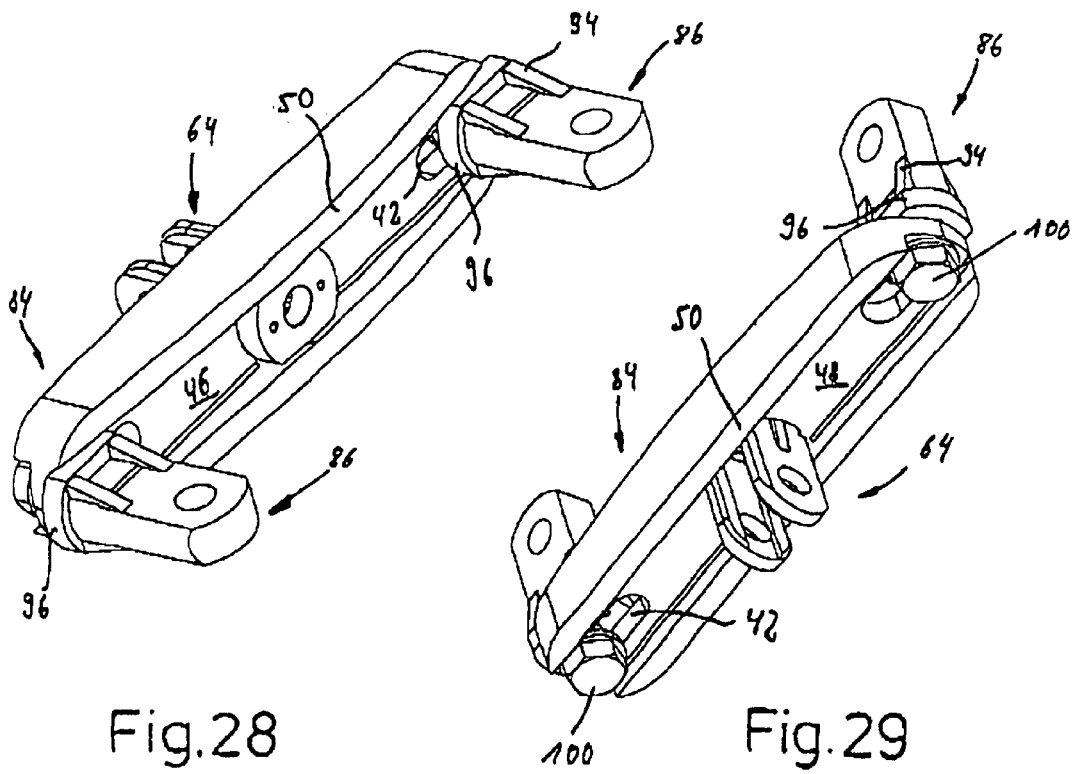
Figure 30:
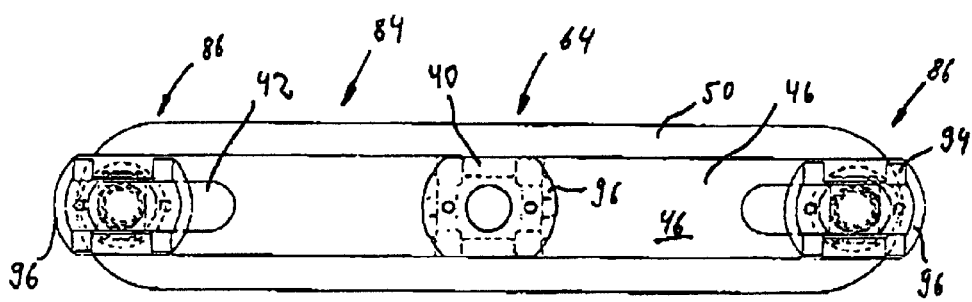
Figure 31:
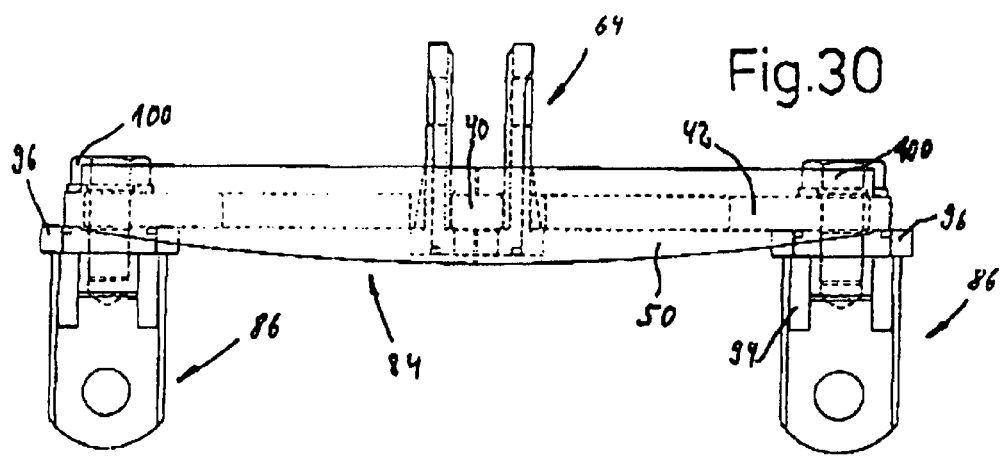
Figure 36:
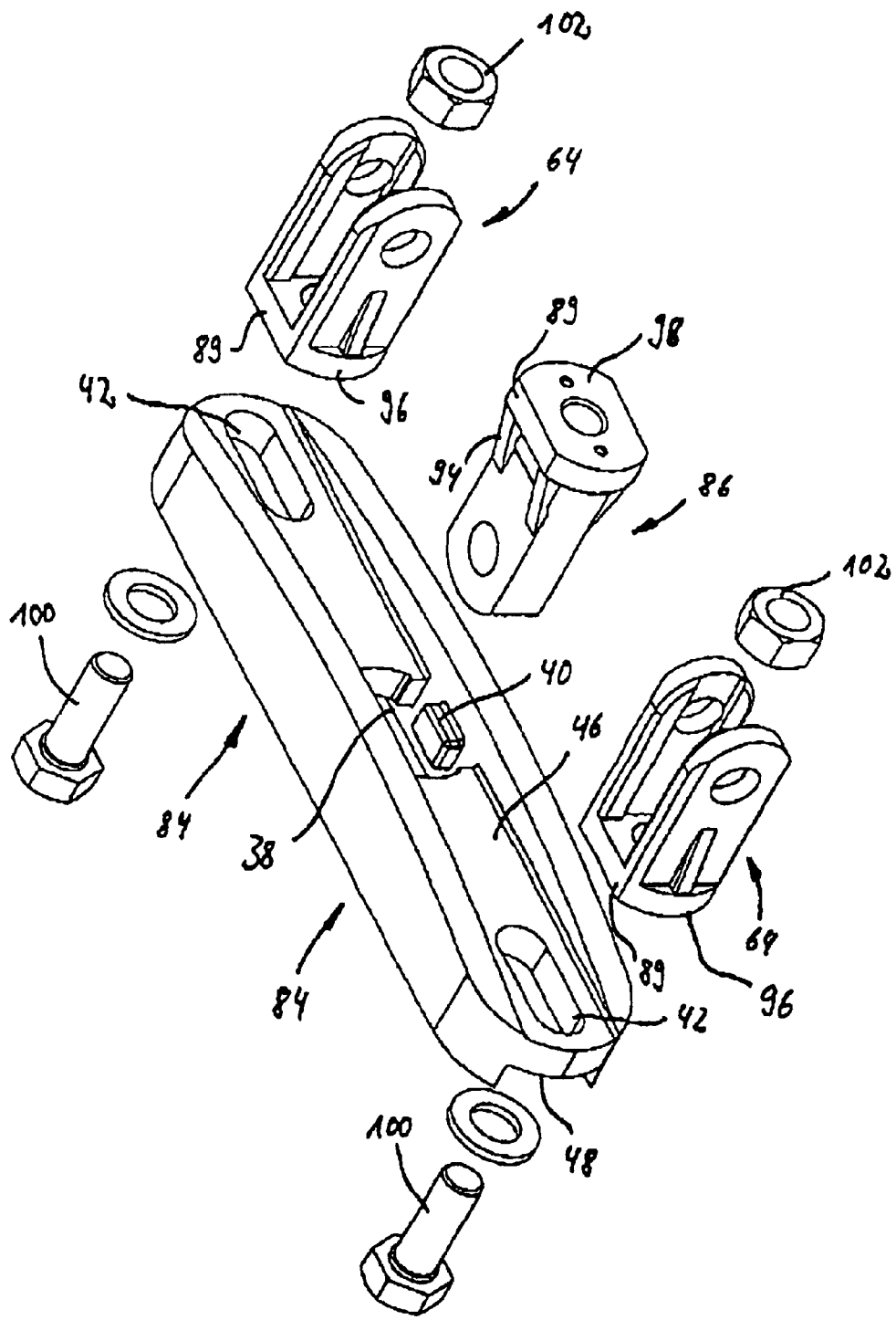
Figure 37:
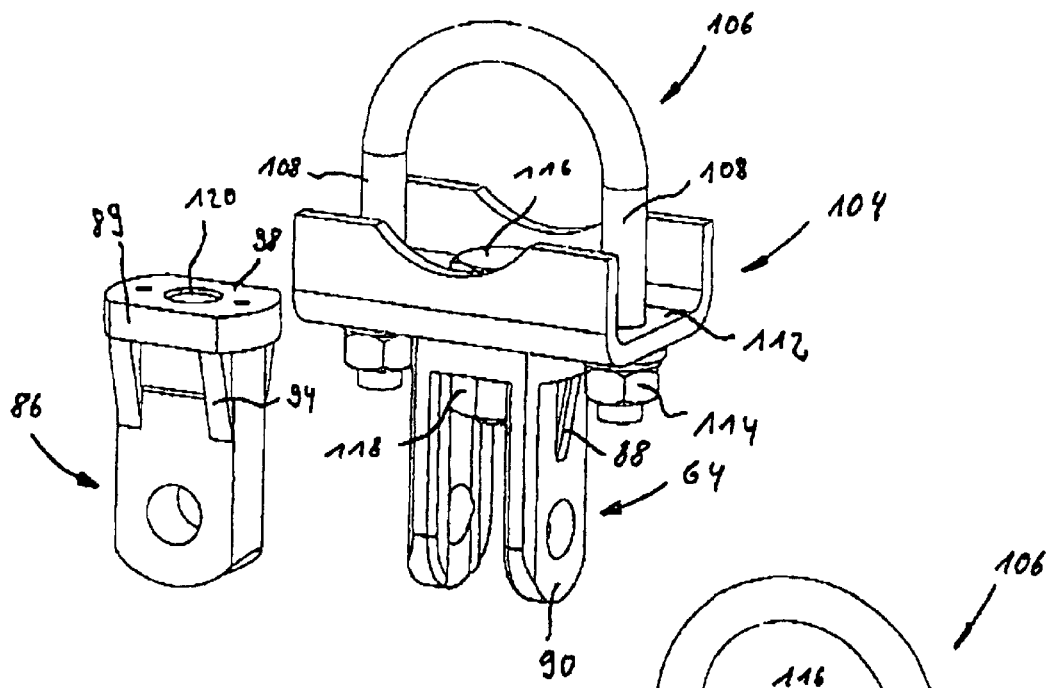
Figure 38:
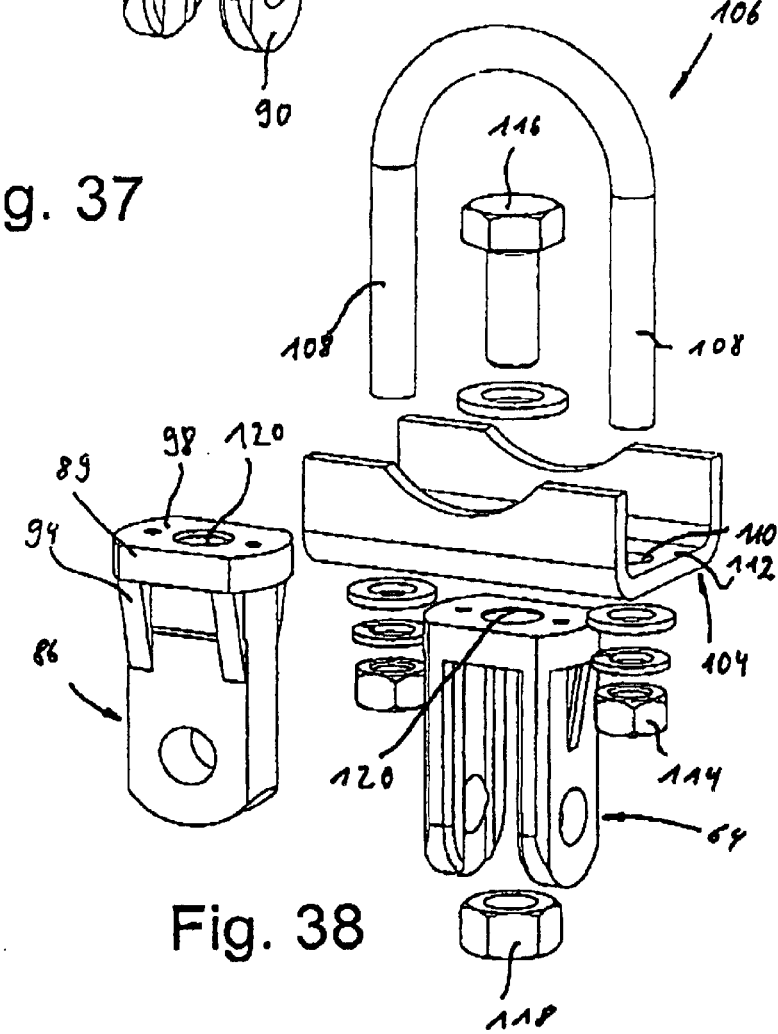
Figure 39:
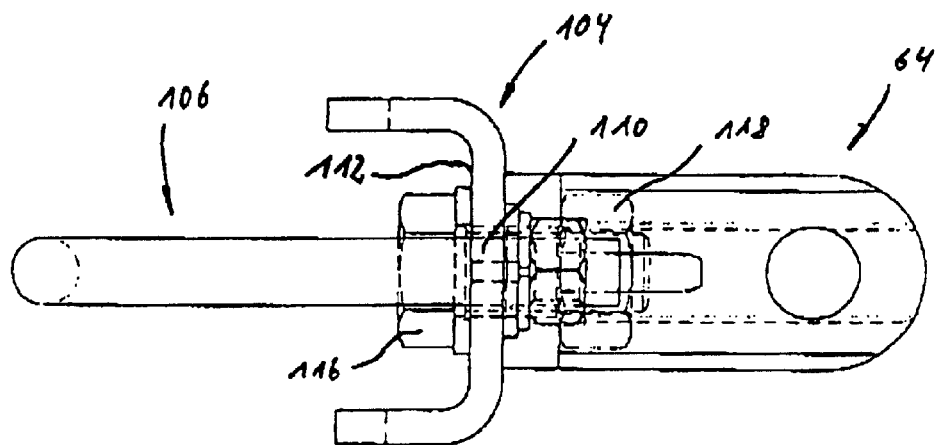
Figure 40:
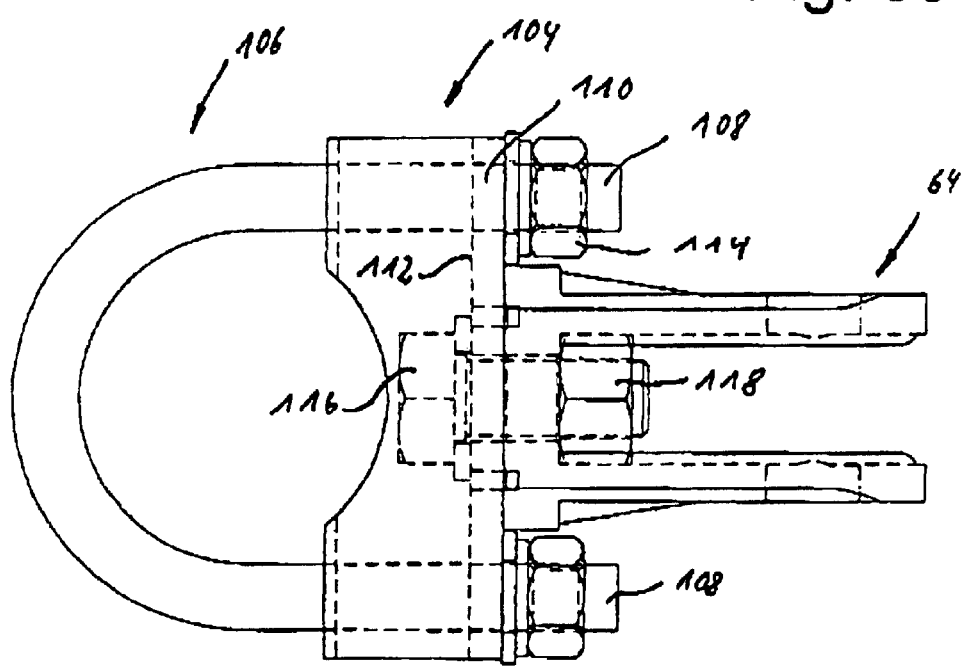
Figure 41:
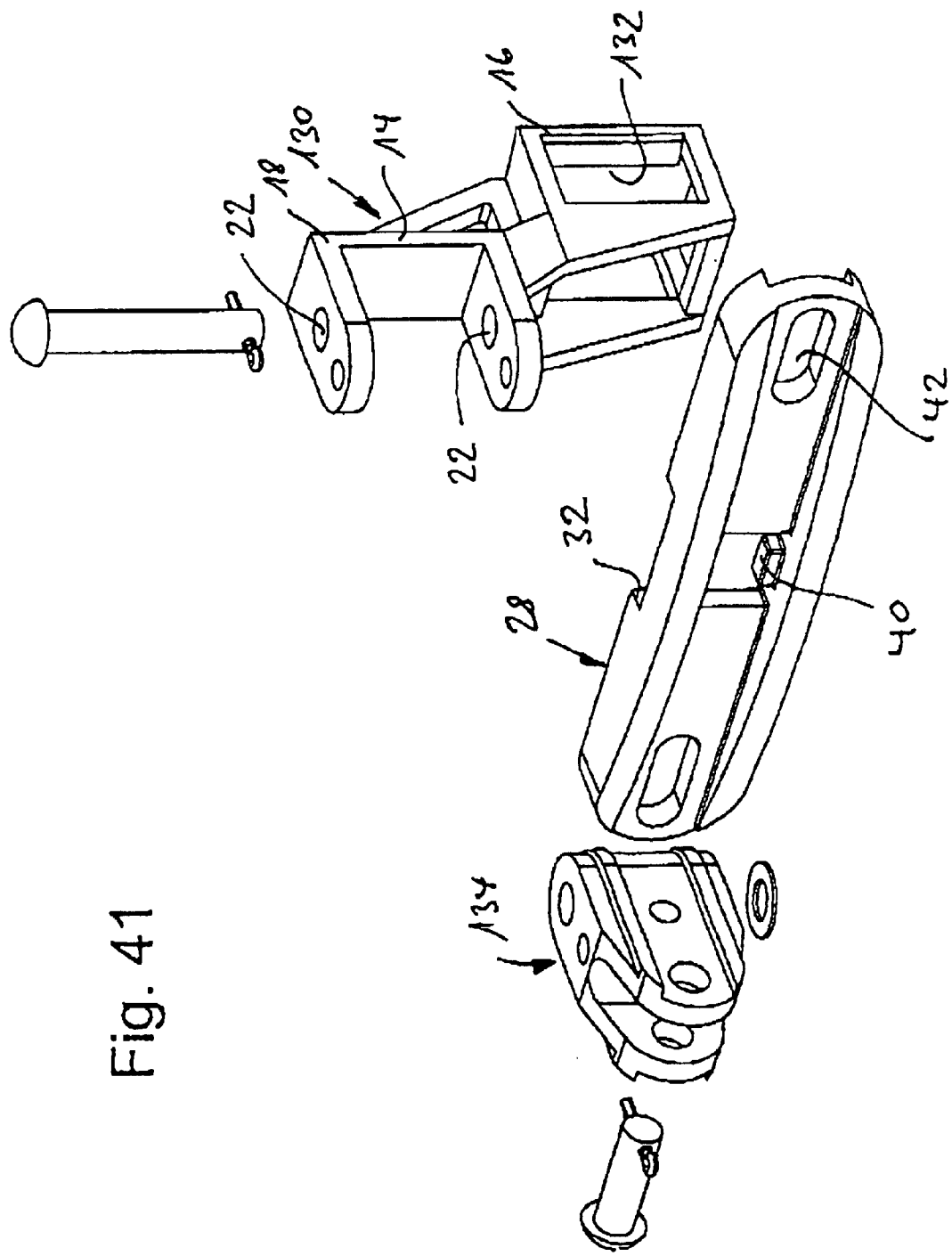
Figure 42:
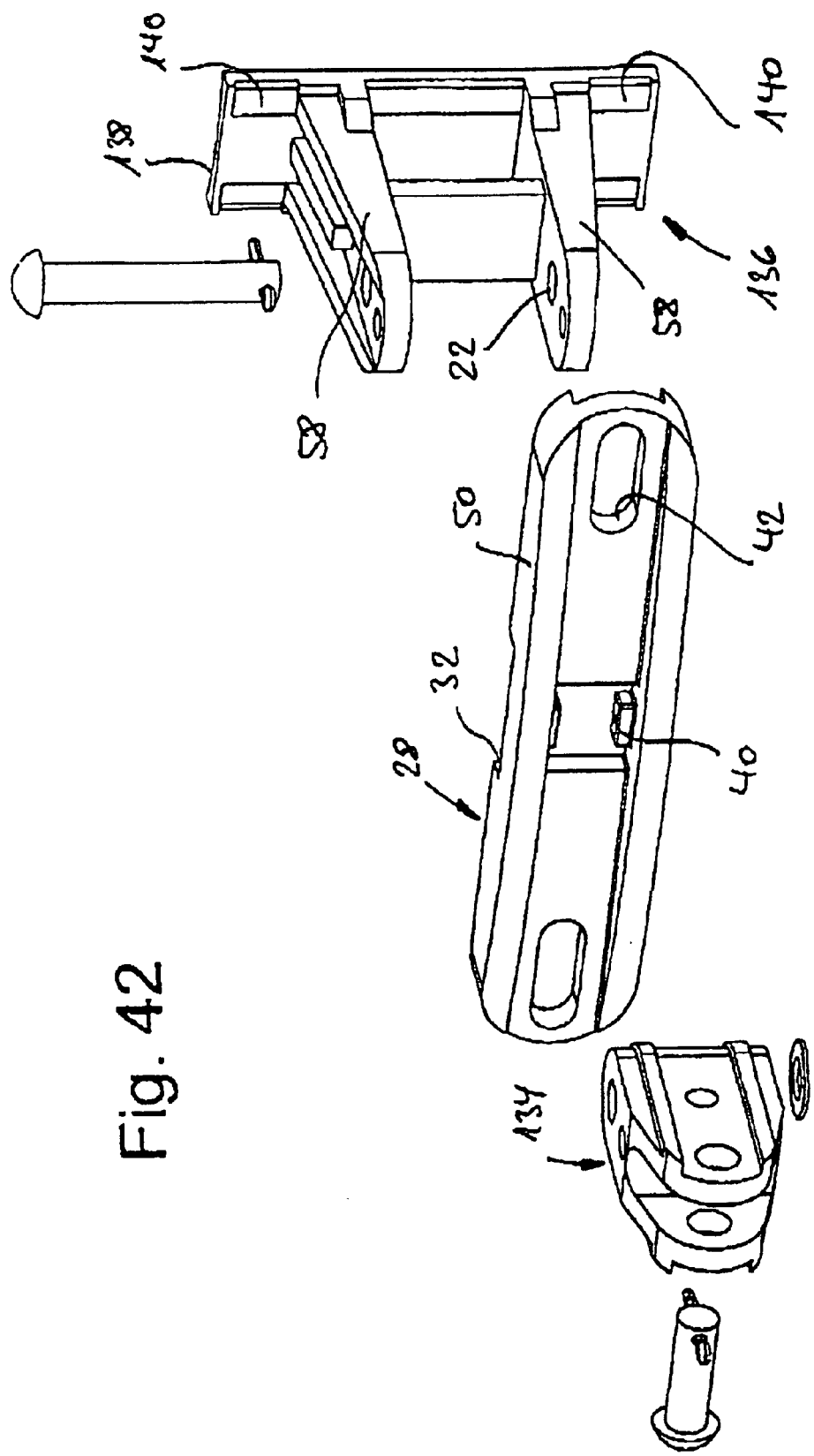
Figure 43:
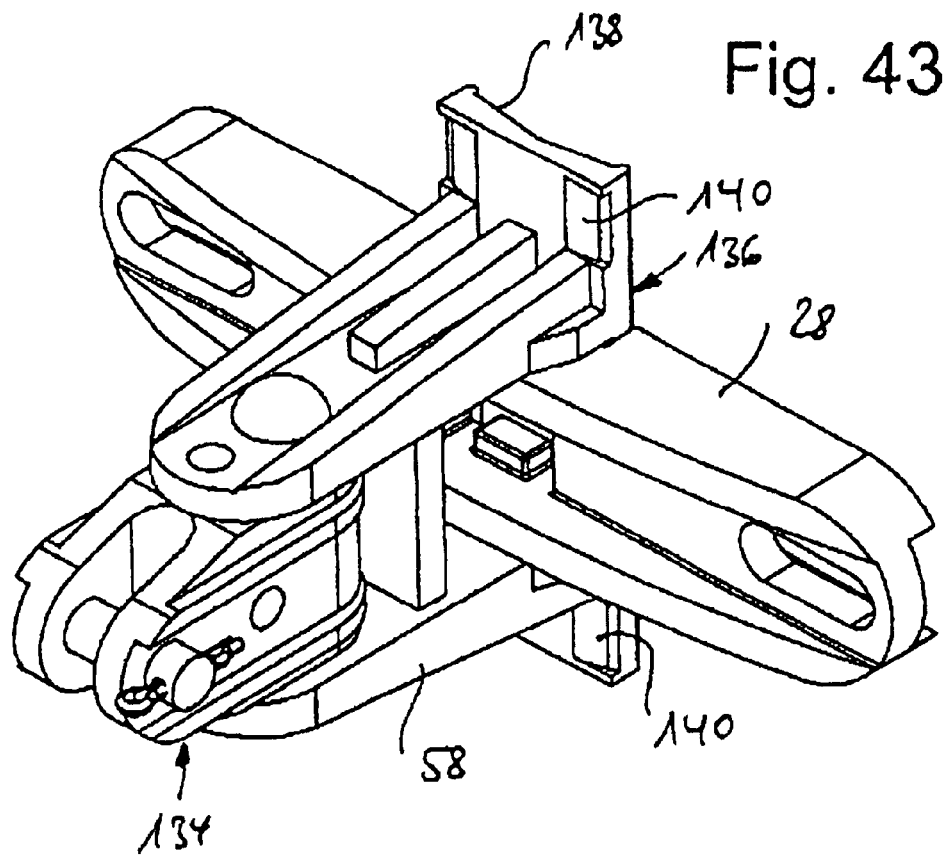
Figure 44:
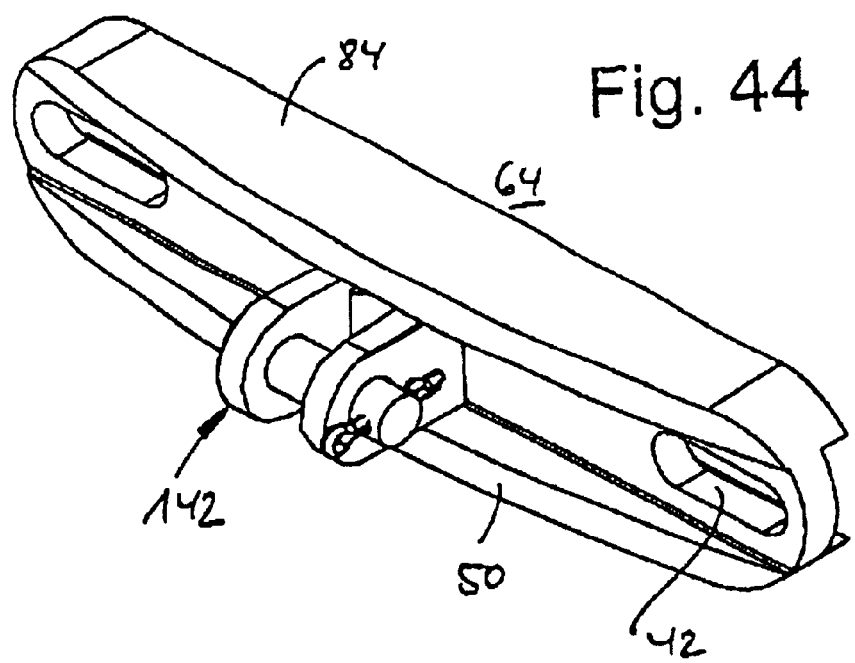
Figure 45:
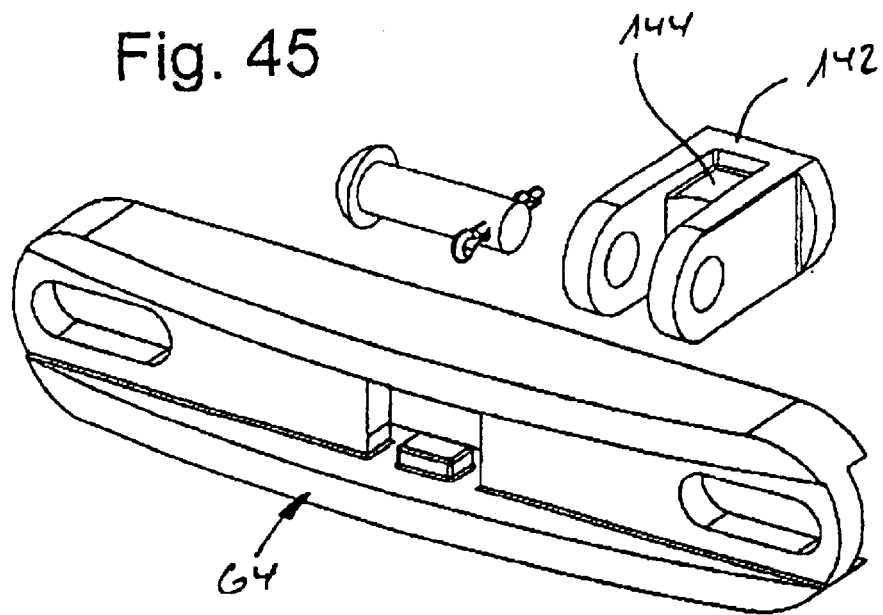

Further advantages, features and details of the supporting and fastening arrangement according to the invention for current-carrying contact wires will be apparent from the description hereinafter of preferred embodiments and with reference to the drawings in which:

FIG. 1 is a perspective view of a rotary pivot arrangement as the central element of the supporting and fastening arrangement according to the invention in accordance with a first preferred embodiment with a rotary pivot which is displaced axially with respect to a horizontal mast support portion, FIG. 2 is an oblique perspective plan view of the rotary pivot arrangement of FIG. 1, FIGS. 3–5 show further views of the rotary pivot arrangement of FIGS. 1 and 2, FIG. 6 shows an exploded view of the arrangement of FIG. 1 with essential individual components and the co-operation thereof relative to each other, FIG. 7 shows a perspective side view of a rotary pivot arrangement as a component part of the supporting and fastening arrangement of the invention in accordance with a second embodiment thereof with a rotary pivot arranged at the height of a mast support portion, FIG. 8 is an oblique perspective plan view of the rotary pivot arrangement of FIG. 7, FIGS. 9–11 show further views of the rotary pivot arrangement of FIGS. 7 and 8, FIG. 12 is an exploded view of the rotary pivot arrangement of FIG. 7 with the functional elements and the relative arrangement thereof with respect to each other, FIG. 13 shows an exploded view of a tube adaptor in accordance with a third embodiment of the invention, which is to be used in particular also in conjunction with the rotary pivots of the first and second embodiments, FIG. 14 shows a perspective side view of a tube adaptor as shown in FIG. 13 for connection to a bracing tube of large diameter, FIG. 15 shows a tube adaptor as illustrated in FIGS. 13 and 14 for a bracing tube of medium diameter, wherein this Figure shows an alternative configuration with a bar (lug) as the connecting element, FIG. 16 shows a tube adaptor as shown in FIGS. 13 through 15 for bracing tubes of small tube diameter, FIGS. 17–19 show side views of the tube adaptors of FIGS. 14 through 16, FIG. 20 shows a fourth embodiment of the present invention with a mast support part into which a fork is directly fitted for connection to a tube adaptor or the like, FIGS. 21 and 22 show further views of the mast support part in FIG. 20, FIG. 23 shows an exploded view of the mast support part with fork portion shown separately therefrom, FIG. 24 shows an alternative configuration of the mast support part of the fourth embodiment which, as an alternative to the view in FIG. 20, has a lug (a bar) as the connecting element, FIGS. 25 and 26 show further views of the structure shown in FIG. 24, FIG. 27 shows an exploded view of the arrangement of FIG. 24 with a lug or bar element shown separately from the mast support part, FIG. 28 shows a fifth embodiment of the invention with a mast support part, a central connection fork and a pair of connection lugs, FIG. 29 shows another perspective view of the embodiment of FIG. 28, FIGS. 30 and 31 show further views of the embodiment of FIG. 28, FIG. 32 shows a form of implementation, equivalent to FIG. 28, of the fifth embodiment with a central lug element and a pair of fork elements, FIG. 33 shows a further perspective view of the embodiment of FIG. 32, FIGS. 34 and 35 show additional views of the embodiment of FIG. 32, FIG. 36 shows an exploded view of the arrangement of the fifth embodiment of FIGS. 32 through 35, FIGS. 37a, b show a view of the tube connector for use in a sixth embodiment of the present invention with an alternatively illustrated connecting fork or bar, FIGS. 38a, b show an exploded view of the view in FIG. 37 with the functional elements and the interconnection thereof, FIGS. 39 and 40 show further views of the embodiment of FIG. 37, FIG. 41 shows an exploded view similar to FIG. 6 of a seventh embodiment of the invention, in particular with an alternative configuration of the coupling element, FIG. 42 shows an exploded view similar to FIG. 12 of an eighth embodiment of the invention with an alternative coupling element to FIG. 12, FIG. 43 shows a view similar to FIG. 7 of the eighth embodiment in the assembled condition of the individual elements, FIG. 44 shows a perspective view similar to FIG. 20 with an alternative configuration of the fork element, FIG. 45 shows an exploded view of the arrangement of FIG. 44, and FIGS. 46a, b show two views, turned through 90°, of the alternative fork portion (FIG. 44, FIG. 45) with a female screwthread fastening at the bottom side, to a tube adaptor.

FIG. 1 is a perspective front view of a rotary pivot arrangement as is provided for connecting to a mast or tower, a compression bracing tube (not shown) which is coupled to a rotary pivot 10. For that purpose, as can be seen in particular from the exploded view in FIG. 6, the illustrated arrangement has as a central connecting portion a receiving or mounting holder 12 which in the upper region forms a yoke-shaped pivot mounting (pivot portion) 14 to which a box-shaped receiving or mounting portion 16 is integrally joined.

The receiving holder 12 is preferably made in one piece and is in the form of a casting or milled component.

A pair of leg portions 18 of the pivot mounting 14, which are disposed in mutually opposite relationship, form together with a fork pivot portion 20 the rotary pivot 10 which is pivotable about a pivot axis which is embodied by a pivot bolt or pin 24 which is passed through pivot holes 22 in the leg portions 18 (secured at the other end by a pivot nut 26, or alternatively a split pin). A (compression) bracing tube can then be connected to the fork of the pivot portion 20, which fork in the assembled condition extends horizontally, as will be described in greater detail hereinafter.

At the other end in the assembled condition the receiving holder 12 has a horizontally extending (mast) support portion 28 which is of such dimensions in respect of its profile that it can be inserted into the box-shaped space in the receiving portion 16. More precisely, in the inserted condition, the support portion 28 rests with its downwardly directed narrow side on a bottom plate 30 of the receiving portion 16 and is guided by same; the support portion 28 is held firmly in a direction perpendicular to the insertion direction, in the event of a tensile or pressure loading being applied, by a milled vertical opening 32 in the rearward region of the flat side which is dimensioned to embrace a rear wall portion 34 of the receiving holder 12. In other words, in the inserted condition of the support portion 28 and when the arrangement is subjected to a pressure loading, the opening 32 fixes the support portion 28 flush in its insertion position relative to the receiving holder 12.

Additional fixing is afforded by a projection 36 which is approximately parallelepipedic but which is provided with slightly rounded end faces and which is formed in one piece from a rear wall portion 34 and which in terms of its peripheral dimensions is such that it can engage into an opening 38 which is provided centrally in the support portion 28 and which is of a suitably matched peripheral contour. Finally, also provided in the opening 38 are knob-like projections 40 at mutually opposite transverse sides of the opening 38, which serve to facilitate assembly and for additional fixing of the support portion which is usually also referred to as the 'mast shackle'.

Accordingly, in the illustrated fashion, a strong connection is afforded between the support portion 28 and the receiving holder 12, and accordingly therefore also in relation to the compression strut tube which is pivotably connected to the pivot mounting 14 and which—beyond the illustrated mechanical coupling elements—does not require any further fastening elements whatsoever and in particular no additional screw means. More specifically, fixing is advantageously effected exclusively by the compression force applied by the bracing tube to the rotary pivot and is thus transmitted to the mast; in the illustrated fashion therefore the compression bracing tube acts by way of the horizontal fork 20 directly on slots 42 provided in the support portion 28 at the ends thereof, while in a further preferred aspect the line of force from the fork holes 44 extends at an angle of about 35° relative to the slots 42.

Further structural details of the support portion 28 can be seen in particular form the exploded view in FIG. 6, thus for example the slightly rounded configuration of the (transverse) side portions 50 arranged at both sides of a front (46) and a rear (48) longitudinal slot, whereby the support portion 28 is in profile (see FIG. 5) of a light double-T-shape and thus combines low weight with maximum stability for the illustrated application of force.

Reference will now be made to FIGS. 7 through 12 to describe a structure for the rotary pivot arrangement, which is slightly modified in comparison with the first embodiment.

The central difference in the second embodiment lies in the modified configuration of the receiving holder 12 which, in the second embodiment shown in FIGS. 7 through 12, is in the form of a substantially U-shaped or yoke-shaped holder 52 which comprises an integrally formed arrangement consisting of a rear wall 54 and a pair of leg portions 58 which are attached at both sides and which are provided with additional lateral reinforcing struts; the leg portions 58 then provide pivot holes 22 for the pivot bolt or pin 24 which, as already described in relation to the first embodiment, then guides the fork pivot portion 20 pivotably about the axis of the pin or bolt 24.

Once again, in this second embodiment, for fixing to the U-shaped holder portion 52 the support portion 28 has a rearward slot (opening) 32 and the opening 38 which is additionally provided with knobs 40 engages in fixing relationship on to a projection 62 on the rear wall 54 which is formed similarly to the projection 36 in the first embodiment.

As a result this arrangement in which the rotary pivot 10 and the support portion 12 for the mast fastening are disposed in a horizontal plane also affords precise fixing of the parts relative to each other without the need for additional screw fastenings or the like, in which respect the second embodiment of FIGS. 7 through 12 permits a somewhat more compact implementation of the overall arrangement. In particular FIGS. 7 and 8 once again clearly show the clamping condition of the holder 52 and the support portion 28 relative to each other, in which respect it is possible to clearly see how the knob-like projections 40 in the central opening 38 of the support portion 28 co-operate with the projection 62 of the holder 52.

Reference is now made to FIGS. 13 through 19 to describe a tube adaptor for use in a third embodiment of the present invention, such a tube adaptor being suitable for coupling a tube end, for example of a compression bracing tube, to a rotary pivot 10 of the above-described arrangements. Basically, in the connection, fork and bar (lug) elements co-operate by pivotal interengagement, in which respect, in regard to the present invention, fork elements and bar or lug elements are basically to be viewed as equivalent and if necessary can be interchanged or adapted.

The exploded view in FIG. 13 clearly shows the structure in principle of such a tube adaptor. A fork portion (alternatively: a lug or bar portion) 64 is fastened with its flat rear wall portion 66 on to the end face of a milled-out, flat end face portion 68 of a tube sleeve 70 by means of a fastening screw 72 which engages from the interior through a central opening in the surface 68, wherein the tube sleeve 70, for example of a compression bracing tube, is supported and secured by means of a transverse screw 80 (or a transverse pin or bolt) serving primarily for fastening and non-rotational securing purposes.

Such a tube adaptor is suitable in particular for current tube diameters, in which respect for example the smallest adaptor is of an inside diameter of 1 inch and can thus be used for receiving a tie tube of a diameter of 1 inch.

In the case of the illustrated tube sleeve 70 in addition the end face portion 68 has two land walls 82 which have remained by virtue of the milling operation and which, like the transverse pin or bolt 80, serve for non-rotational securing purposes.

The tube adaptors which are shown in FIGS. 14 through 16 for different inside tube diameters are then used for coupling a correspondingly inserted tube to a counterpart coupling portion, for example in the form of the above-described pivot portion, in which respect for example the end bar portion shown in FIG. 15 then suitably cooperates with a fork portion on the counterpart coupling portion, or vice-versa.

The illustrated adaptor arrangement is distinguished in that case by a high degree of mechanical strength and stability with at the same time simplicity in terms of structure and manufacturing procedure, so that this arrangement makes it possible in a simple fashion to provide a reliable and nonetheless inexpensive cantilever arm system which can carry an appropriate loading.

It will be appreciated in this respect that the configuration of the tube sleeves 70 for the tube adaptor is not limited to the specified standard sizes for the tube ends, but in contrast that configuration is suitable for any inside and outside diameters of the tube ends to be coupled.

With reference to FIGS. 20 through 27, the configurational embodiment of the support portion (mast shackle) according to the invention will be described in greater detail hereinafter. Besides use with a receiving holder 12 or a connecting portion of the above-described embodiments, this structure is also suitable for directly receiving a fork and/or lug/bar portion.

As can be seen from the views in FIGS. 20 through 26, the support portion 84 in accordance with the fourth embodiment only differs from the support portion 28 described in relation to the first and second embodiments, in that in its rearward region the element 84 does not have a vertical slot (vertical opening) 32 but on the contrary is flat at its rear side; that is also directly reasonable when the fourth embodiment of FIGS. 20 through 27 which on the one hand is fastened directly to the support mast and which on the other hand makes the connection to the compression bracing tube by means of forks 64 or lugs does not require any additional holder arrangement.

On the contrary, as can be seen from the exploded views in FIG. 23 (for the fork portion 64) and FIG. 27 (for the lug or bar element 86), the respective coupling portion is fitted directly into the central opening 38 in the support portion 84 and clamped in positively locking relationship there by means of the tapered side portions 50 of the integral element.

In the case of the fork portion 64 (FIGS. 20 through 23), it can be seen that here the outer legs 90 in the inserted condition of the fork portion 64 fix same to the straight end faces of the opening 38 while the knob-like projections 40 engage between the legs 90 and are there in contact with internally disposed, profiled portions of the legs 90.

In contrast, in the case of the lug or bar element 86 (FIGS. 24 through 27), lateral limbs 94 of the lug element 86 contact the transverse surface of the opening 38 on both sides of the knob-like projections 40 and the tongue portion 96 which is rounded at its end is adapted with its external contour to the ends of the opening 38.

This provides that, for both types of connector—both a fork portion 64 and a lug/bar element 86—it is always possible to provide for an optimum, non-rotational, clamping and mechanically strong connection to the support portion 84 (or the support portion 28 in the first and second embodiments), and the arrangement can thus be universally employed for all possible purposes of use, in particular also, as discussed in relation to the fourth embodiment, for coupling purposes, in regard to which additional degrees of freedom, afforded by a rotary pivot as in the first and second embodiments, are not required, and thus the compression pipe can co-operate directly with the support portion and thus with the holding mast or tower.

Once again there is here the advantageous effect that the coupling elements are securely fixed solely by the forces which occur in a load situation, and thus further connecting elements such as a screw connection or the like become redundant.

The plan views in FIGS. 22 and 26 respectively disclose further structural features of the support portion 84; thus, it is possible in particular here to clearly discern the arcuate configuration of the edges, which face forwardly in the views, on one side of the side portions 50; in addition, the position and (relative) dimensions of the slots 42 can also be seen from these views. Finally, it can be clearly seen that at the end the support portion 84 is again rounded on both sides.

Reference will now be made to FIGS. 28 through 36 to describe, as a fifth embodiment, a development of the arrangement in accordance with the fourth embodiment, in which case here the support portion 84 is provided at the end with a pair of additional fork or lug/bar portions.

As shown for the sake of greatest clarity in FIG. 36, in this case a lug element 86 (alternatively, see FIGS. 28 through 31, a fork element) engages through the opening 38 and is fixed in the above-described manner; in contrast to the above-described embodiment however the element 86 is passed through the opening 38 from the opposite direction.

The drawing clearly shows how the base portion 89, which is flattened at both sides, of the lug element 86 is fitted non-rotatably by means of the flat portions into the longitudinal slots 46 and 48 respectively.

A corresponding consideration also applies in regard to the fork portions 64 which in FIG. 36 are additionally anchored at the edges in the slots 42 and which are screwed in place by means of screws 100—being held non-rotatably in the longitudinal slot—in such a way that the respective fork opening extends in opposite relationship to the tongue portion 96 of the lug element 86, the tongue portion being passed through the opening 38.

That arrangement describes the possibility, by means of the slots 42 provided at both ends on the support portion 84, of producing a flexible, adjustable connection to further elements, for example to track-maintaining or tie tubes, in which respect such parts are usually subjected to a tensile loading.

While FIGS. 32 through 36, in relation to this fifth embodiment, describe an arrangement comprising a central lug element 86 and two additional, screwed fork portions 69, it can also be seen in equivalent fashion from FIGS. 28 through 31 that any other combinations are also possible, thus for example a central fork portion 64 is clamped non-rotatably in the above-described manner in the opening 38, together with a pair of screwed bar elements 86 at the ends.

FIGS. 37 to 40 show as a sixth embodiment of the present invention the possibility of producing a coupling between two tubes; once again, the structure in principle of this tube connector which is suitable in particular for use with the above-described system elements is described with reference to the exploded view in FIG. 38.

A U-shaped profile member 104 provided with two rounded configurations in the form of portions of a circle, adapted to the outside diameter of the tube to be accommodated, is intended to co-operate with a loop portion 106 which embraces the periphery of the tube, in such a way that the loop portion 106 can engage with its free ends 108 carrying a male screwthread, through lateral openings 110 in a central bottom surface 112 of the profile member 104, and is braced by means of nuts 114; in an assembled position, a tube is then clampingly braced between the loop portion 106 and the recesses in the U-shaped profile member 104. Attached to the side of the profile member 104, which is opposite to the loop portion 106, is a fork portion 64 or a lug/bar element 86; in the case of the fork portion and lug/bar element, it is screwed to the profile member 104 by a screw combination through a further opening in the bottom surface 112, while the screw 116 engages directly into a female screwthread 120 cut into the base portion 98 of the element.

FIGS. 39 and 40 show further structural details of this embodiment, in which respect it is particularly clear that the U-shaped profile member 104 can be embodied in a particularly suitable manner by a curved sheet metal portion in which the recesses in the form of circular arcs are then milled.

In addition, it is provided that depressions or bores are additionally arranged in particular in the bottom surface of the base portion 98 of the lug element 86 or the fork portion 64. The recesses or bores co-operate with pins or the like securing elements which are fitted in aligned relationship through the bottom surface 112 of the U-shaped profile member 104.

The described arrangement thus makes it possible to provide a connection between two tubes, which is simple in terms of structural configuration and handling and which is nonetheless mechanically strong and which in particular in the present case is used for fastening a cantilever arm tube to a compression strut or between a compression strut and a support tube.

Reference will now be made to FIGS. 41 through 46 to describe a seventh and an eighth embodiment of the invention which in this respect are to be deemed to be advantageous modifications of the embodiments described with reference to FIGS. 6, 7 and 12 and which are to be viewed as the best embodiment of the invention (best mode). In FIGS. 41 through 46, unchanged components or elements, which are therefore still the same, are denoted by identical reference numerals to the respectively similar FIG. 6 (corresponding to FIG. 41), 12 (corresponding to FIG. 42), 7 (corresponding to FIG. 43), 20 (corresponding to FIG. 44), 23 (corresponding to FIG. 45) and 17 (corresponding to FIG. 46), and only the differing features are described afresh.

As can be seen in particular from the view in FIG. 41, as a modification of the embodiment shown in FIG. 6 an alternative receiving or mounting holder 130, in comparison with the mounting or receiving holder 12 in FIG. 6, is designed in such a way that the receiving portion 16 has an open rear wall 132 so that this embodiment in particular also manages without a projection 36 as is shown in FIG. 6. The connection to the support portion 28 is effected in a similar manner by introduction into the receiving portion, but in this case relative fixing when a tensile loading is applied to the arrangement is implemented exclusively by engagement of the rearward-region of the receiving portion 16 into the openings 32 of the support portion 28. In that respect the structural implementation of the receiving holder 12 as a coupling element in accordance with the invention is structurally simplified in relation to the first embodiment.

FIG. 41—like also the development of the eighth embodiment shown in FIG. 42—also shows a slightly modified configuration of the pivot portion 134 (reference numeral 20 in FIG. 6 or in FIG. 12), but these components are functionally identical. As can be seen moreover from the drawings, the nut-and-screw combination shown in FIGS. 6 and 12 respectively is replaced by a pin-split pin combination which acts in otherwise the same fashion.

Similarly to the structure shown in FIG. 41, FIG. 42 shows a more compact receiving or mounting holder 36 which, like also the one-piece element 130, does not have a rearward projection (as shown for example in FIG. 12 and indicated by reference numeral 62).

As a further advantageous feature of this embodiment—also to be implemented in the seventh embodiment of FIG. 41—the receiving or mounting holder 136 has at its rear an obtuse, V-shaped recess or cut-out 138 (see also the assembly view in FIG. 43), the recess or cut-out 138 permitting the arrangement to be mounted directly to a pipe, a mast or tower or the like, in a vertical direction. For that purpose, fixing is effected using suitable fastening means, for example bands or straps (not shown), in such a way that the mounting holder 136 is firmly fitted with the rearward recesses 138 against a longitudinal rotational member (mast, pipe) and fastening bands or straps or the like which embrace the mast or the pipe then engage for fixing purposes over fastening portions 140 of the holder 136. That permits particularly simple, rapid and nonetheless firm and strong fixing of the mounting holders directly to a mast, in which respect moreover the recess 138 provides not only for accurate fixing but in addition also for adaptability to different mast or pipe diameters.

Figure 46:
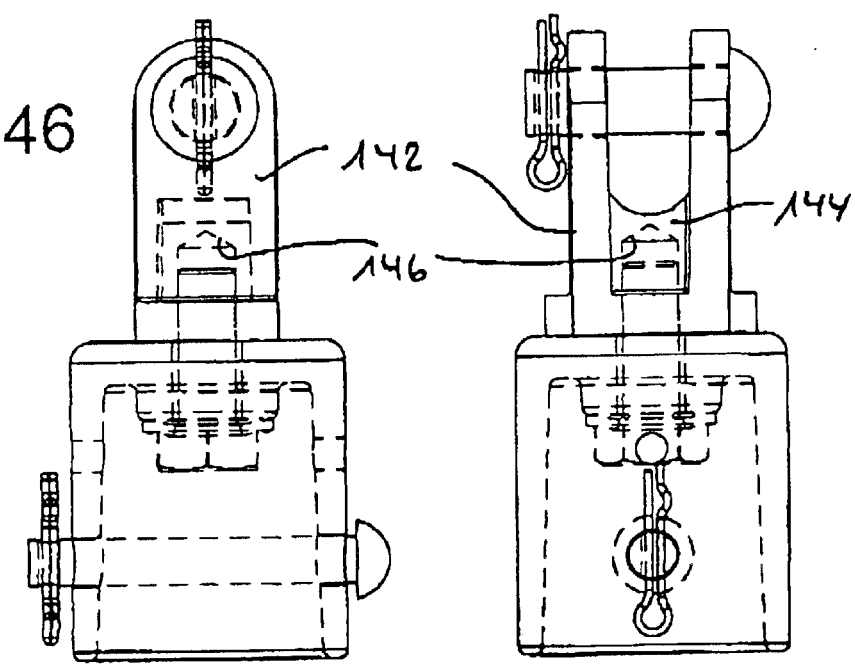

FIGS. 44 through 46 show in accordance with the present invention a particular configuration of the fork portion 64; a fork portion 142 which otherwise is of a configuration as described hereinbefore has, instead of a bore, in the central connecting region 144, a female screwthread 146 which then, see the view in FIG. 46, permits simplified fastening to a tube adaptor merely by introducing a nut from the inside.

In accordance with the present invention the developments or alternative embodiments of FIGS. 41 through 46 can also be combined with or replaced by all the above-described embodiments so that the fastening arrangement according to the invention is expanded by additional functionality and flexibility.

Accordingly therefore, by means of a modular system, in a manner which is structurally simple and advantageous from the point of view of operational technology, the present invention makes it possible to provide an assembly, holding and insulating system which, particularly for flexible uses, with a minimum of individual structural elements, permits adaptation to the most widely varying mounting and insulating conditions. Accordingly, the flexible configurability of the various elements means that the system cost can be considerably reduced as there is a corresponding reduction in the number of components and units to be produced and stocked. In addition the components which are mechanically strong and of a structurally simple configuration, primarily the support portion, make it possible to withstand even severe loadings without the need for example for additional connection complication which would be reflected in corresponding assembly.

The present invention is not limited to the described embodiments which can be linked together or joined together in any combination; on the contrary it is in accordance with the invention also to include other structural shapes, materials or forms of connection.

What is claimed is:

1. A supporting and fastening arrangement for contact wires comprising a one-piece elongate support portion which can be fixed by means of suitable fastening means to as mast, a pipe, or a house wall, and a coupling element for connecting the support portion to a bracing tube, wherein the support portion has a central first opening and/or recess which is provided to co-operate with a matching connecting portion of the coupling element and which is adapted to make a connection which can be plugged in and released and which is secured in respect of rotation and which is fixed when placed under a tensile and/or pressure loading, and wherein the coupling element has a pivot portion fitted thereto and connected to-a counterpart fork coupling element which is adapted for connecting to a bracing tube, and wherein the coupling element is in the form of a receiving holder for the support portion and has a receiving portion for insertion and positively locking retention of the support portion, and the coupling element is in the form of a yoke-shaped holder which to provide the receiving portion embraces the support portion in a U-shape in the region of the first opening and is adapted to provide the pivot portion for receiving the coupling element counterpart fork at first and second leg portions of the holder.

2. An arrangement as set forth in claim 1 characterised in that the support portion has a cross section which at least in a portion-wise manner is of a double-T-shaped configuration and which has on both sides of a front and a rearward longitudinal slot a pair of side portions with an edge configuration which is rounded in the direction in which the longitudinal slots extend.

3. An arrangement as set forth in claim 1 characterised in that at the end, at least at one end, the support portion has a slot forming a second opening which is disposed in the plane of the first opening.

4. An arrangement as set forth in claim 1 characterised in that in the region of the first opening the support portion has a recess which extends perpendicularly to the direction in which the support portion extends and which is such that in a condition of connection to the coupling element a portion of the coupling element engages into the recess and additionally fixes the coupling element.

5. An arrangement as set forth in claim 1 characterised in that the receiving portion and the pivot portion are in one piece.

6. An arrangement as set forth in claim 1 characterised in that said counterpart fork coupling element is fitted non-rotatably into longitudinal slots of the support portion and can also be fixed by means of a sleeve element to a tube end.

7. An arrangement as set forth in claim 6 characterised in that free legs of the counterpart fork coupling element are of such dimensions that in an assembled condition they project through the first opening and/or the longitudinal slots and non-rotatably fix the fork element when under a tensile loading relative to the support portion.

8. An arrangement as set forth in claim 1 characterised by a bar element which is such that it can be non-rotatably fitted into longitudinal slots of the support portion and can also be fixed by means of a sleeve element to a tube end.

9. An arrangement as set forth in claim 8 characterised in that a bar portion of the bar element is of such dimensions that in an assembled condition it projects through the first opening and/or the longitudinal slots and non-rotatably fixes the bar element when under a tensile loading relative to the support portion.

10. An arrangement as set forth in claim 1 characterised in that the support portion is adapted for jointly cooperating with at least one fork element.

11. An arrangement as set forth in claim 6 characterised in that the counterpart fork coupling element and/or the bar element has at the bottom a female screwthread.

12. A coupling element, in particular for use in a supporting and fastening arrangement as set forth in claim 1 characterised by a yoke-shaped pivot portion which is adapted for connection to a counterpart coupling portion and which has a recess which is formed parallel to a pivot axis of the pivot portion and which is in opposite relationship to the counterpart coupling portion and which is such that the coupling element can be fixed thereby to a mast, pipe support in a direction extending parallel to the pivot axis, wherein formed adjacent to the pivot portion is at least one fastening portion which is to be attached in one-piece relationship, for such a fixing.

13. An arrangement as set forth in claim 1 characterised in that the support portion is adapted for jointly cooperating with at least one bar element.

* * * * *